(No Model.)  DE KERNIEA J. T. HIETT.  13 Sheets—Sheet 3.
CALCULATING MACHINE.
No. 580,863.  Patented Apr. 20, 1897.

Attest:
G. A. Pennington
F. R. Cornwall

Inventor
De K. J. T. Hiett
By Paul Bakewell, Atty.

(No Model.) DE KERNIEA J. T. HIETT. 13 Sheets—Sheet 10.
CALCULATING MACHINE.

No. 580,863. Patented Apr. 20, 1897.

Attest:
G. A. Pennington
S. R. Cornwall

Inventor:
De K. J. T. Hiett
By Paul Bakewell
Atty.

(No Model.)
DE KERNIEA J. T. HIETT.
CALCULATING MACHINE.
No. 580,863.
Patented Apr. 20, 1897.
13 Sheets—Sheet 11.
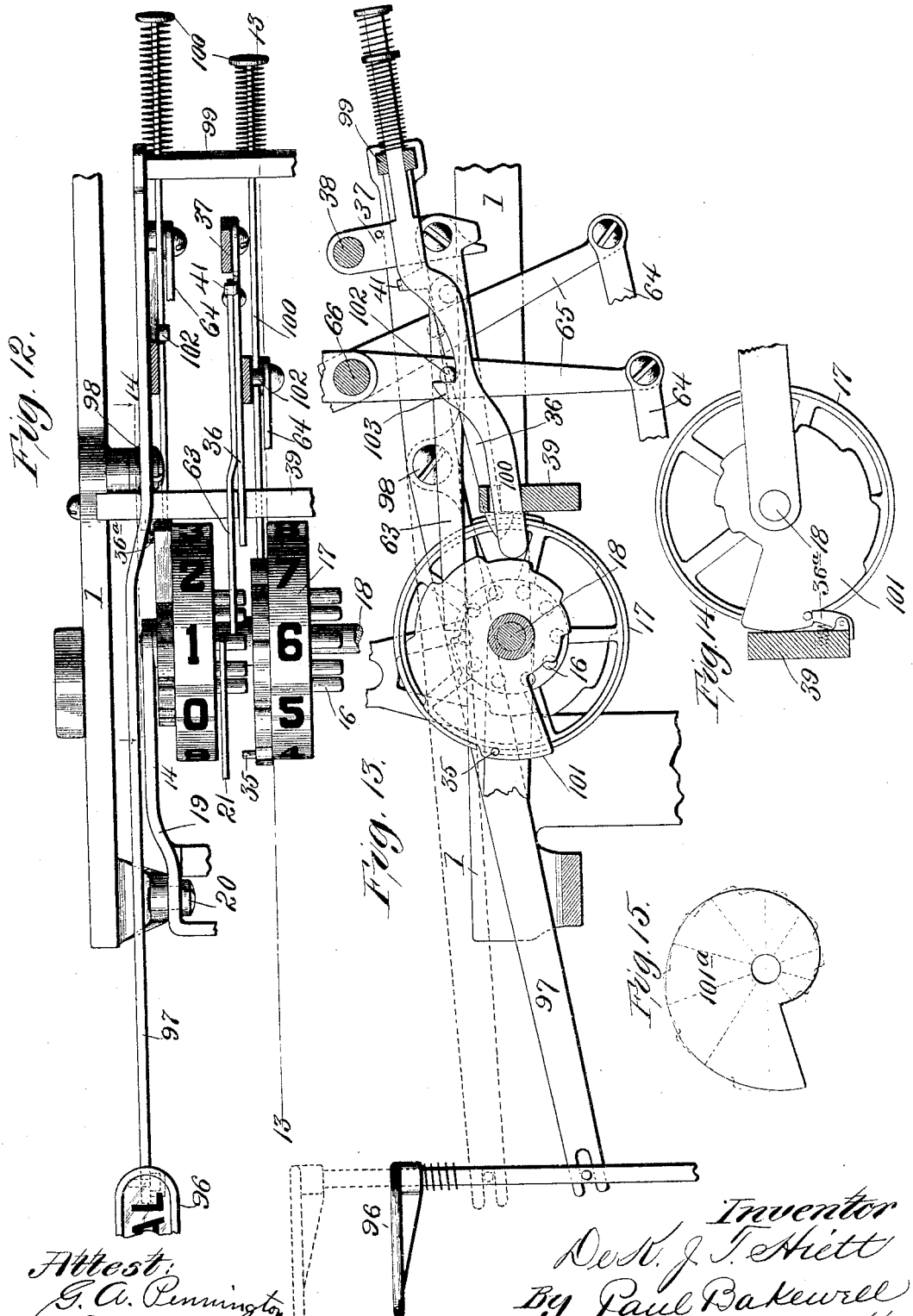
Attest:
G. A. Pennington
J. R. Cornwall
Inventor
DeK. J. T. Hiett
By Paul Bakewell
Atty

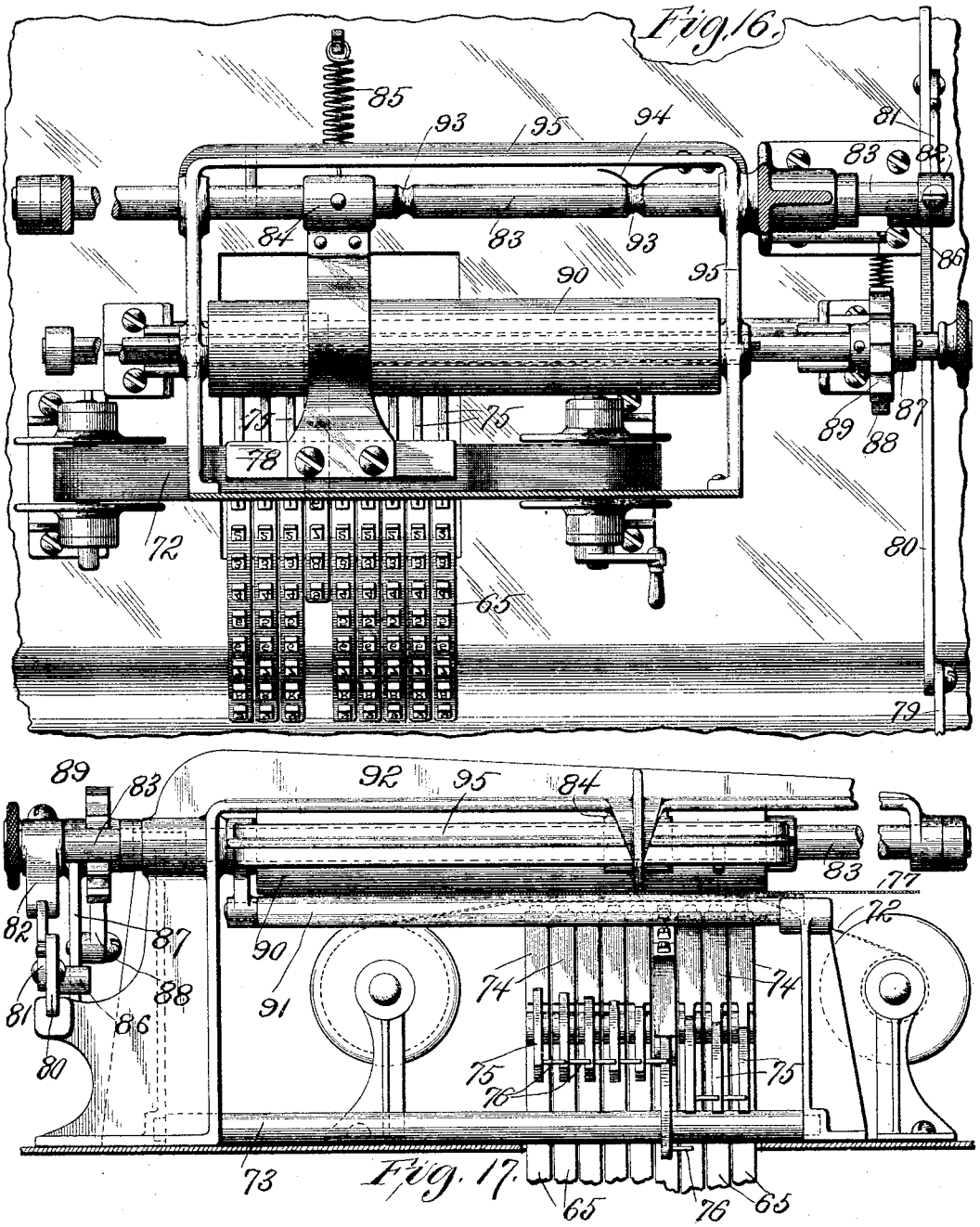

(No Model.) 13 Sheets—Sheet 13.
DE KERNIEA J. T. HIETT.
CALCULATING MACHINE.
No. 580,863. Patented Apr. 20, 1897.
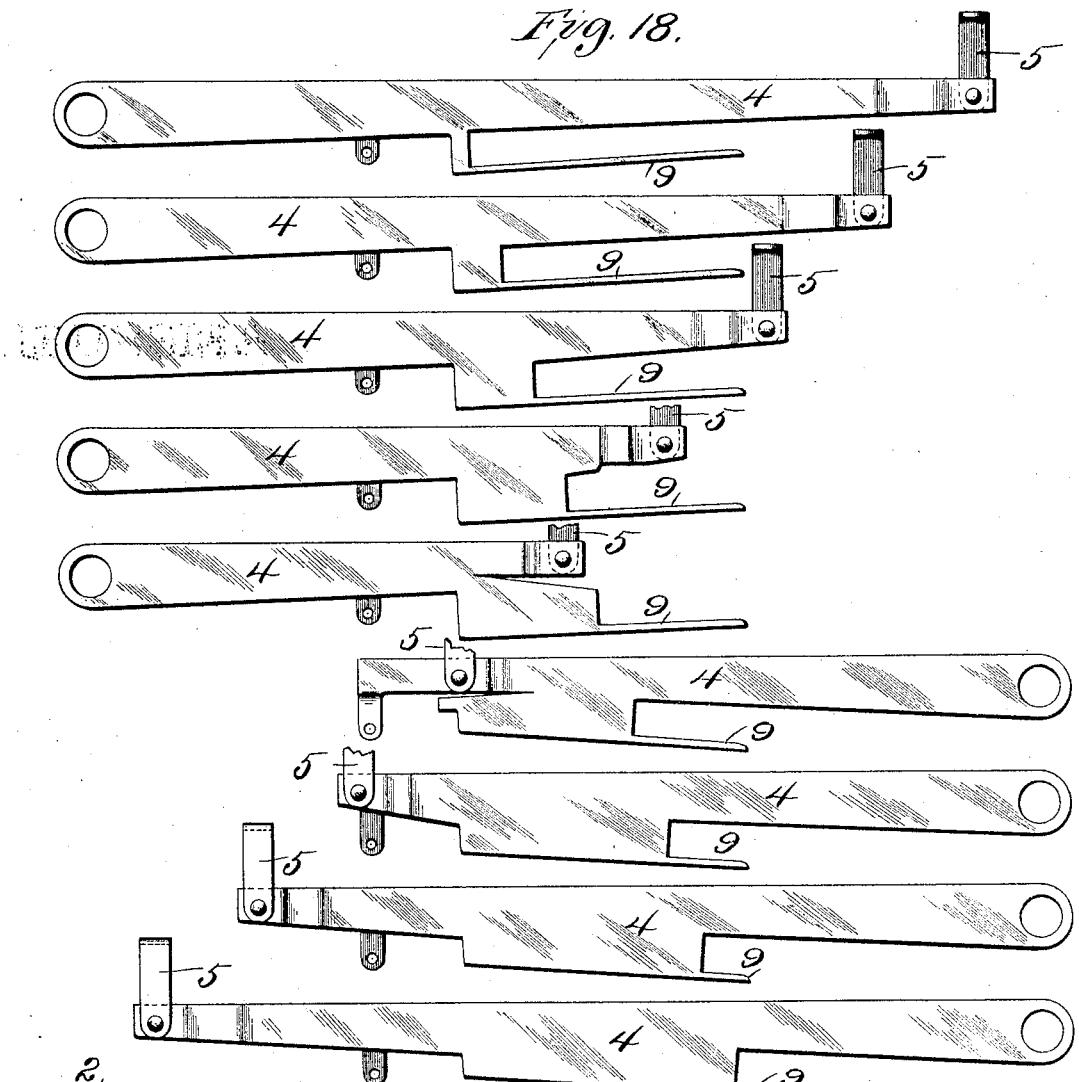
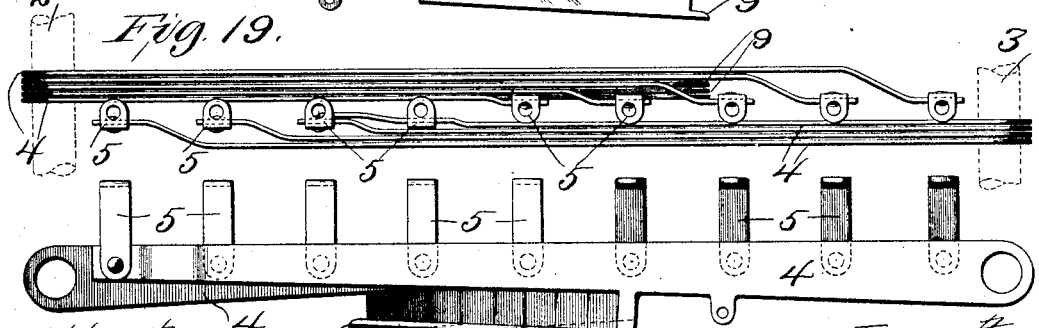

UNITED STATES PATENT OFFICE.

DE KERNIEA J. T. HIETT, OF ST. LOUIS, MISSOURI, ASSIGNOR, BY DIRECT AND MESNE ASSIGNMENTS, OF THREE-FOURTHS TO EDMUND F. WICKHAM, OF SAME PLACE, AND BENJAMIN T. CABLE, OF ROCK ISLAND, ILLINOIS.

CALCULATING-MACHINE.

SPECIFICATION forming part of Letters Patent No. 580,863, dated April 20, 1897.

Application filed September 16, 1896. Serial No. 605,983. (No model.)

*To all whom it may concern:*

Be it known that I, DE KERNIEA J. T. HIETT, a citizen of the United States, residing at the city of St. Louis, State of Missouri, have invented a certain new and useful Improvement in Calculating-Machines, of which the following is a full, clear, and exact description, reference being had to the accompanying drawings, forming a part of this specification, in which—

Figure 1:
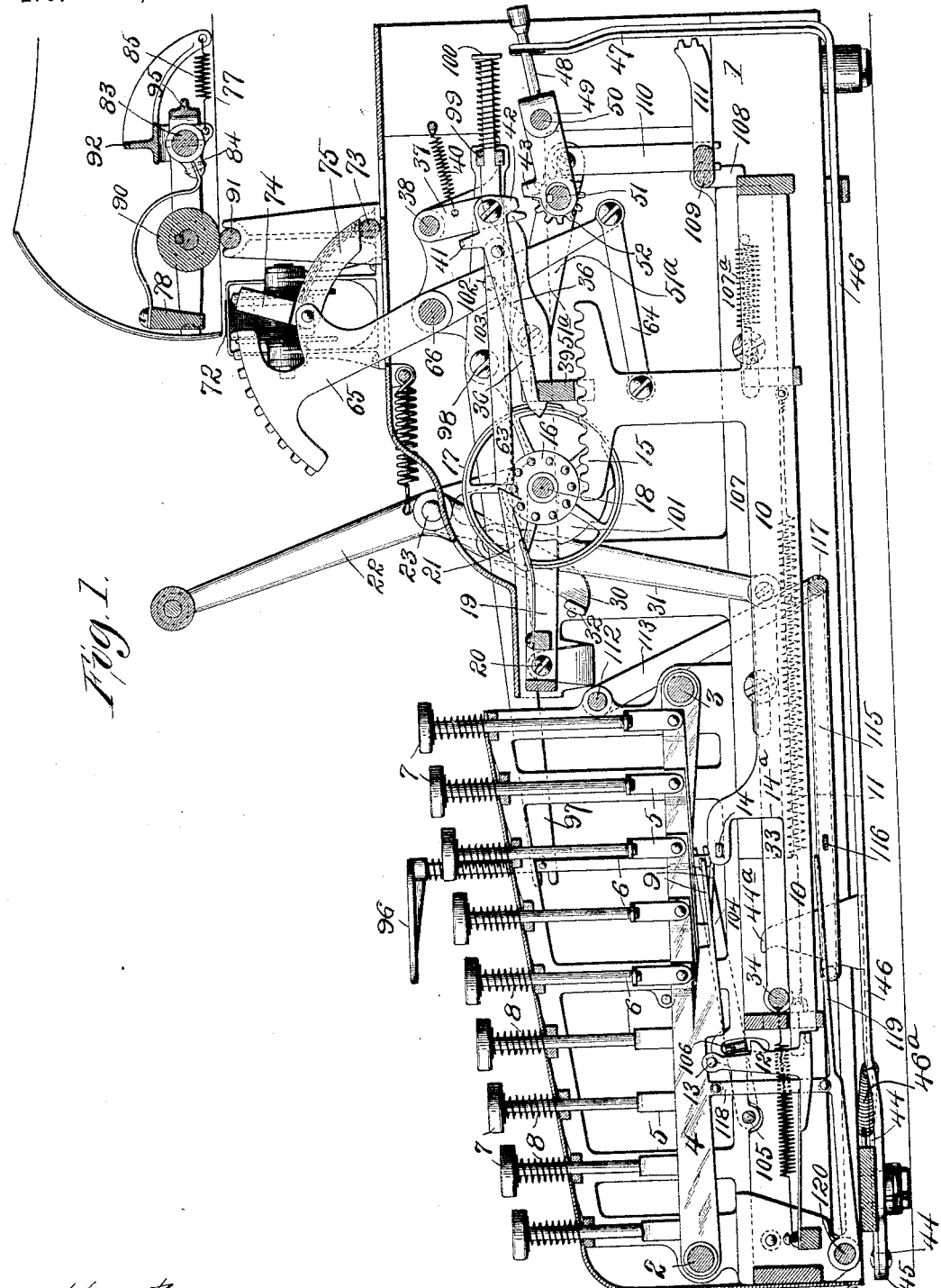
Figure 2:
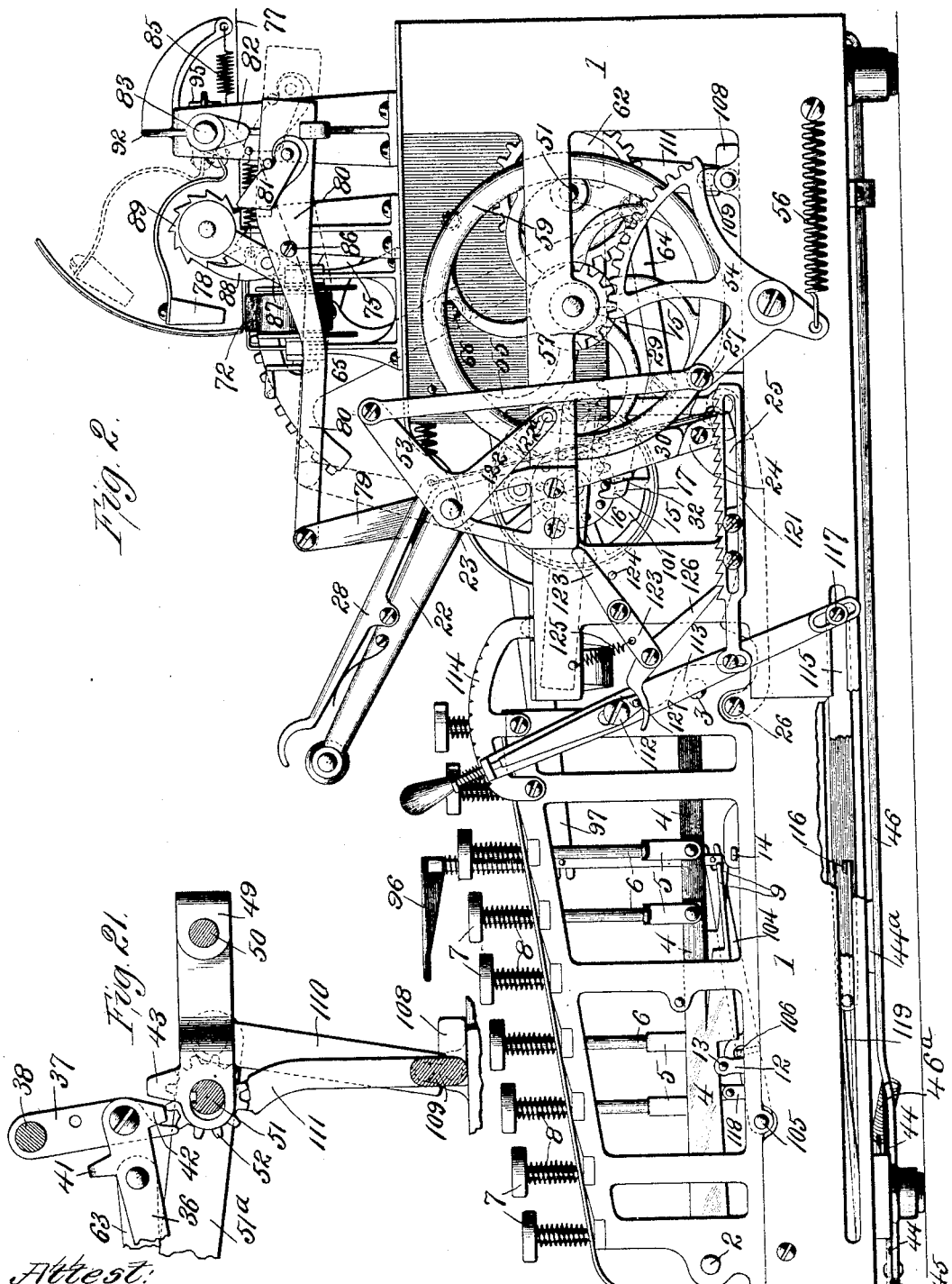
Figure 3:
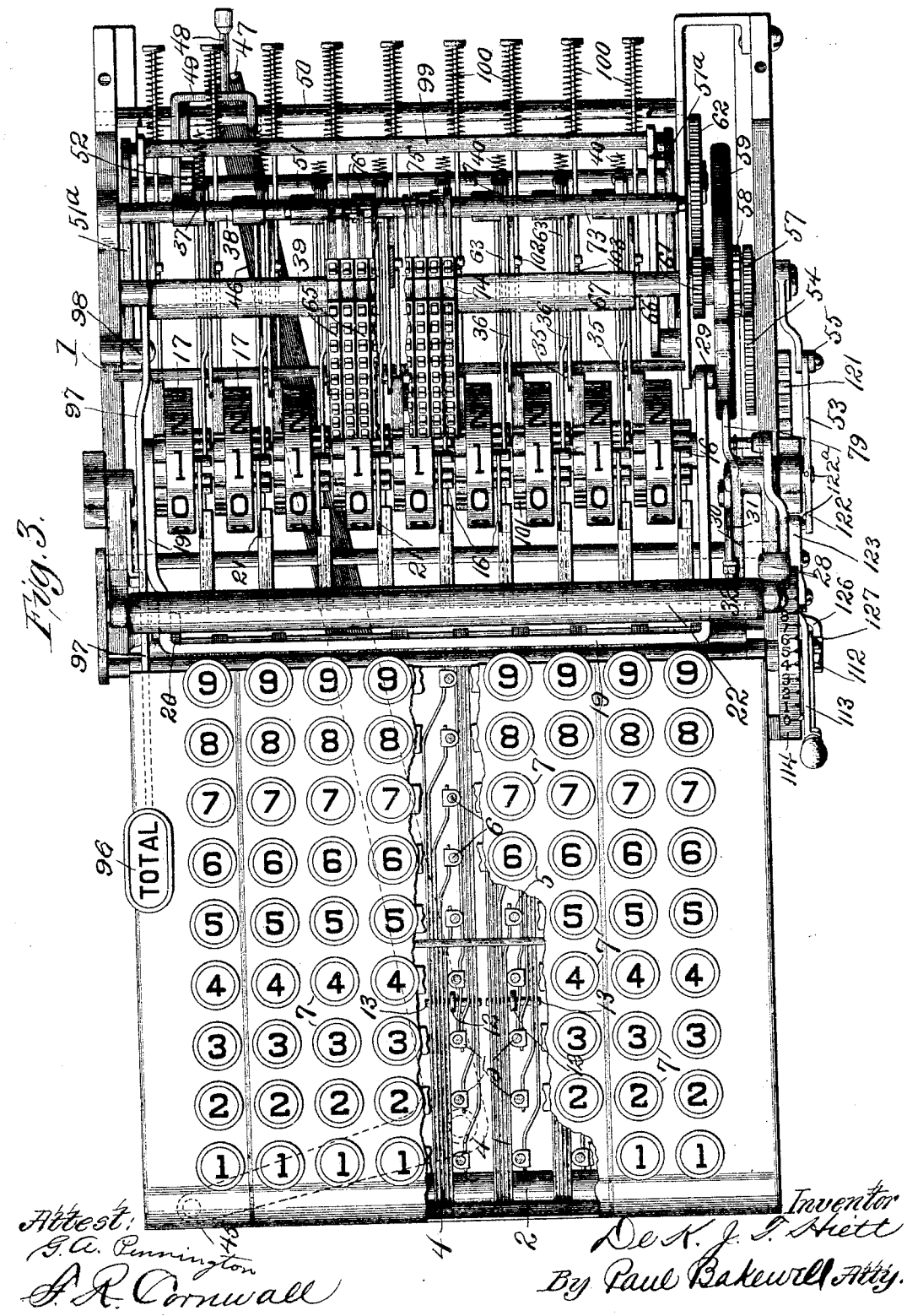
Figure 4:
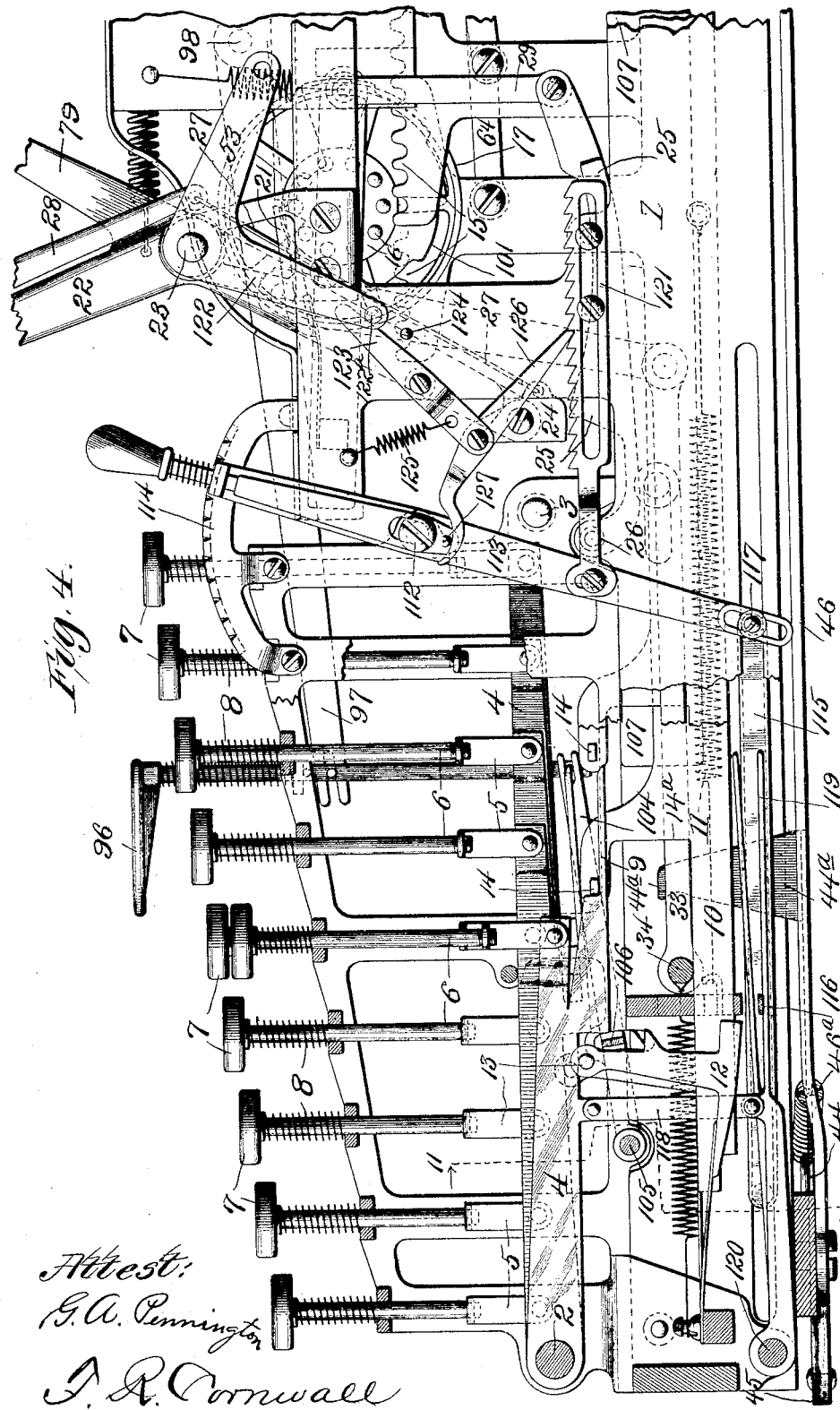
Figure 5:
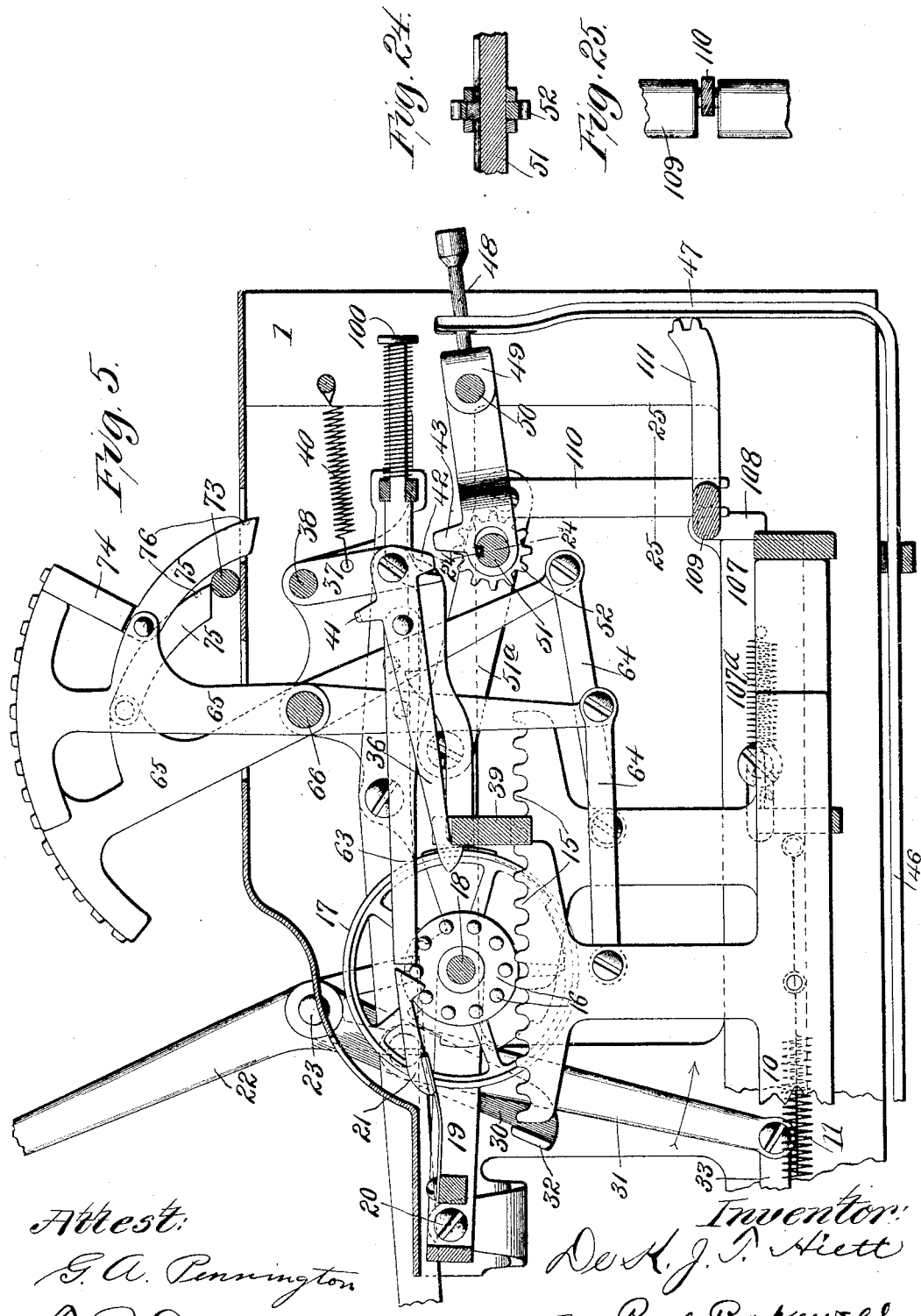
Figure 6:
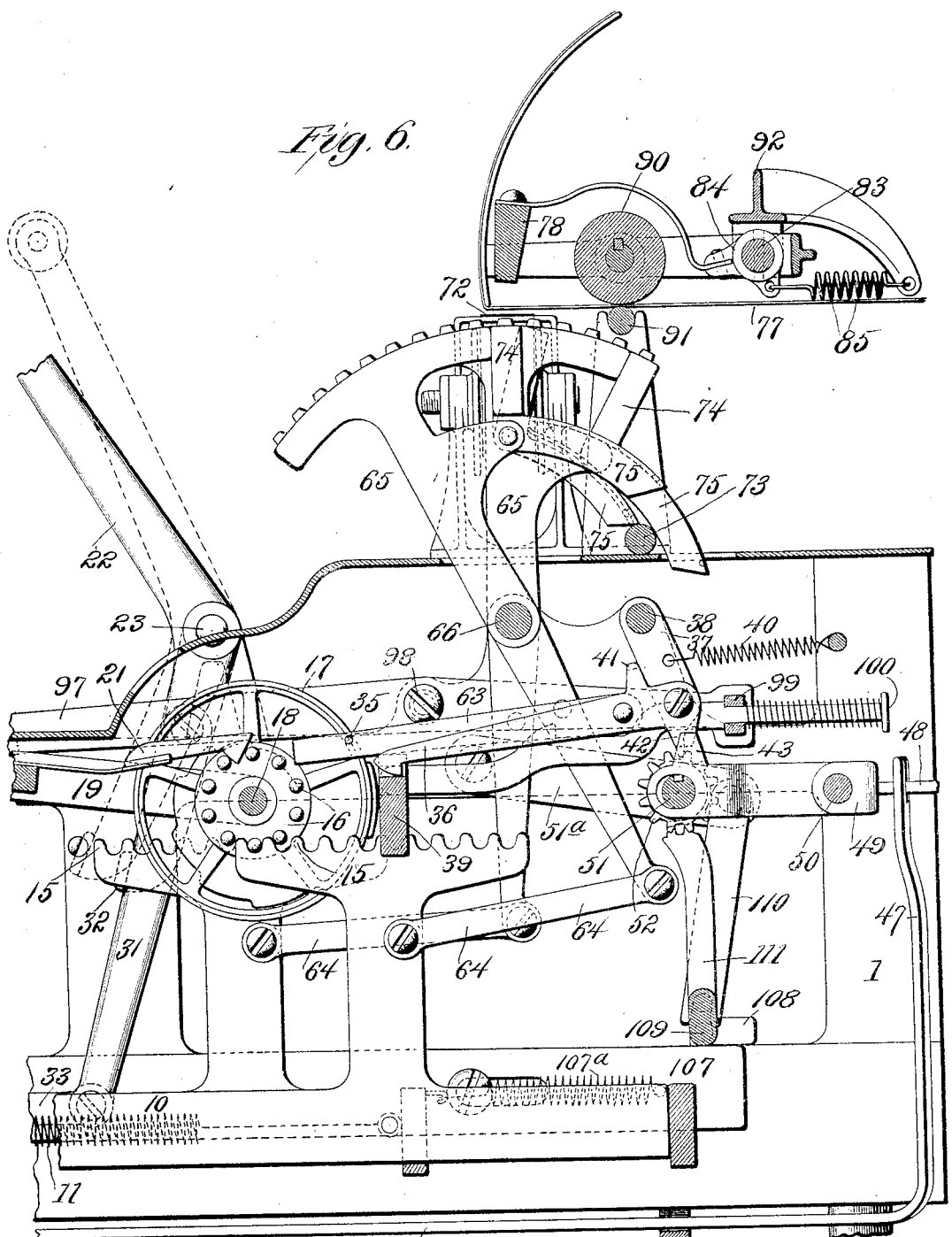
Figure 7:
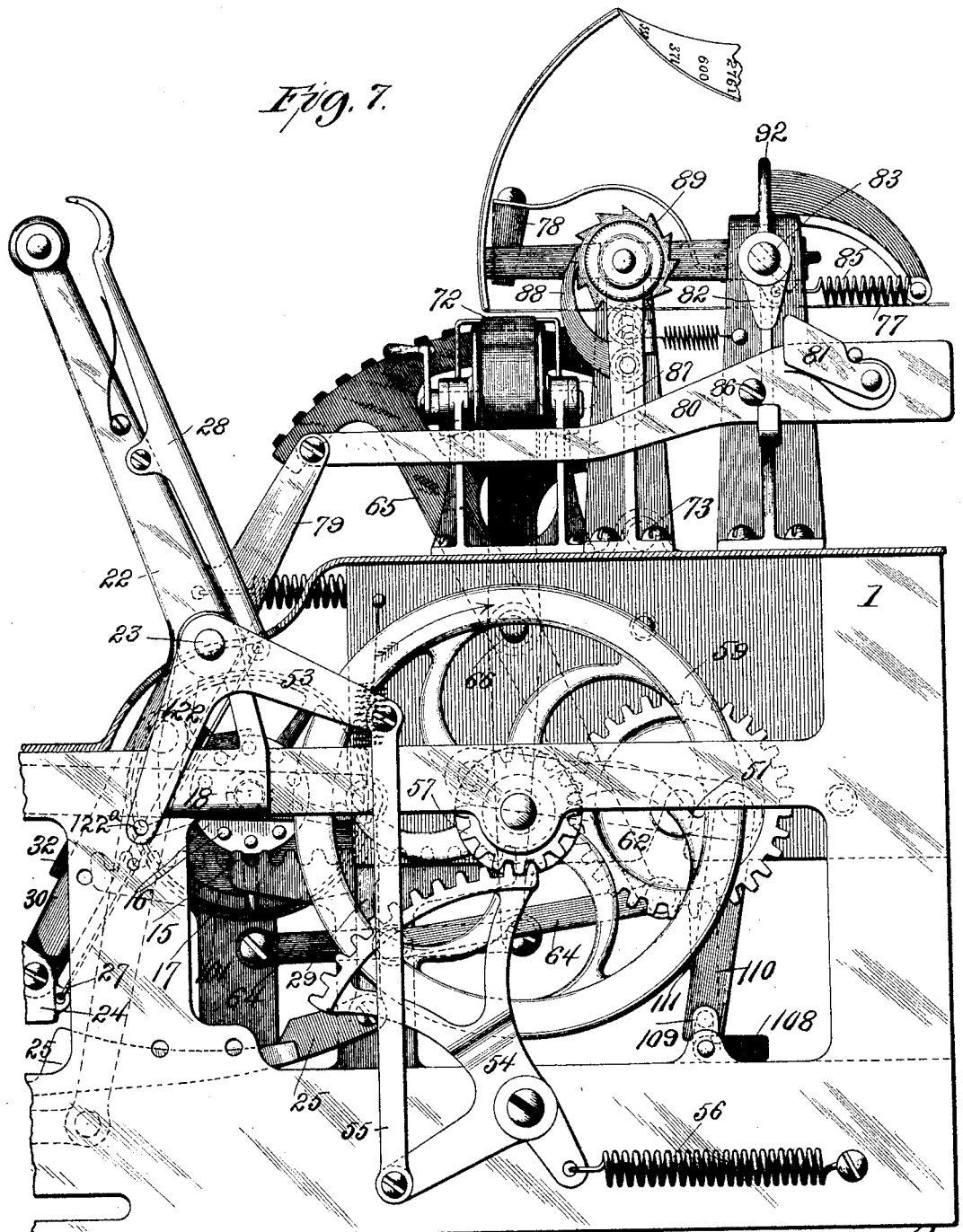
Figure 8:
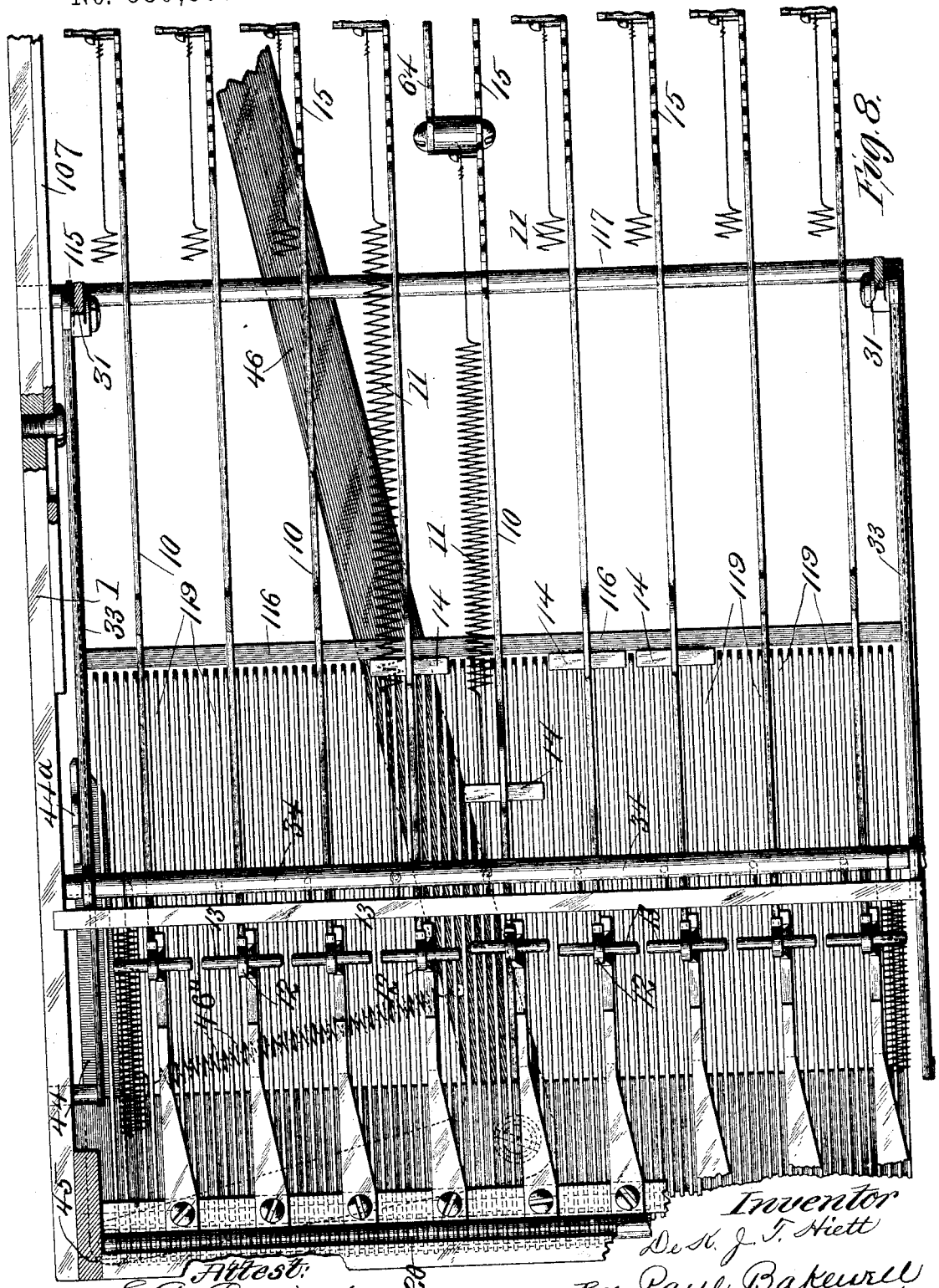
Figure 9:
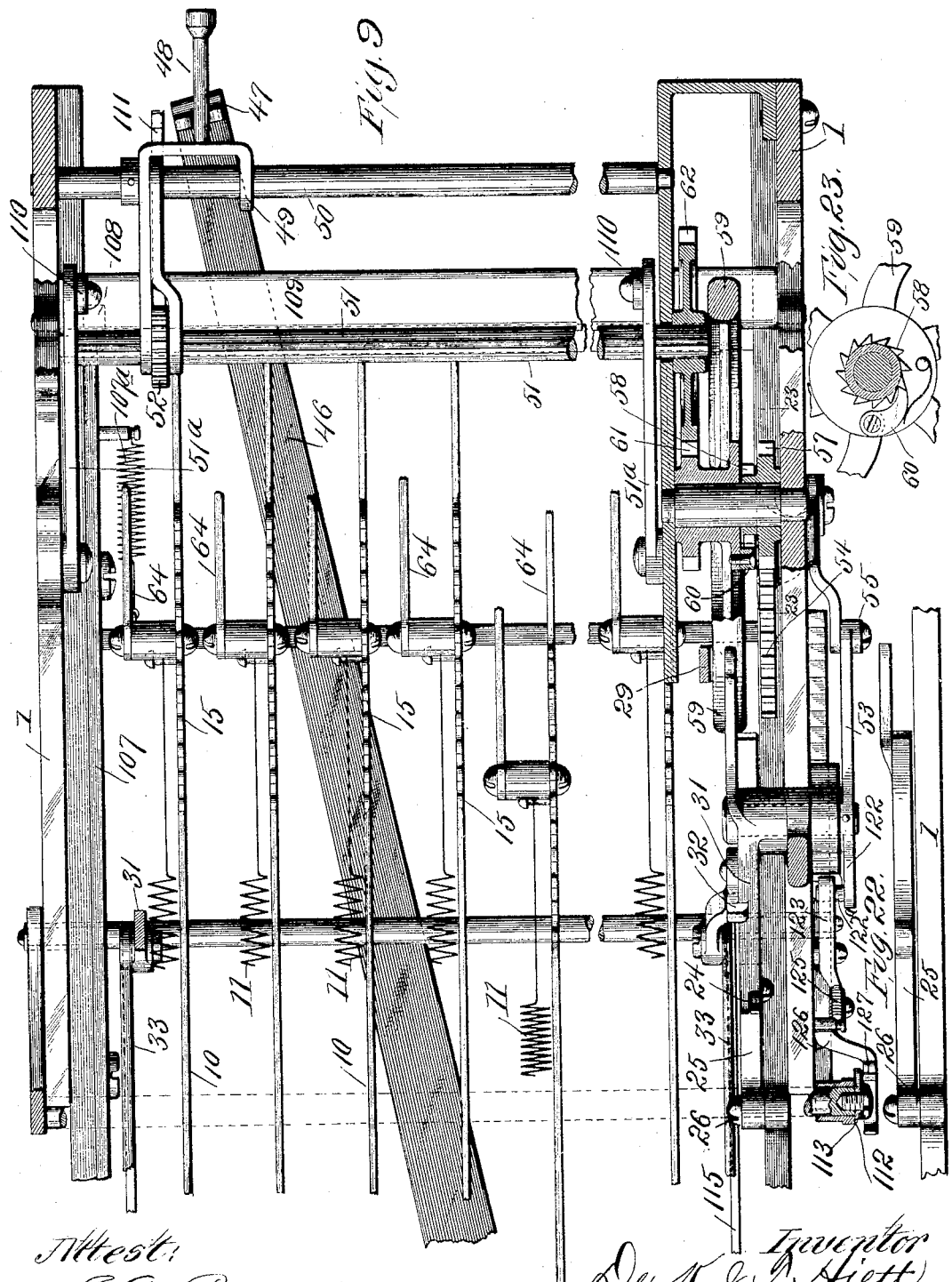
Figure 10:
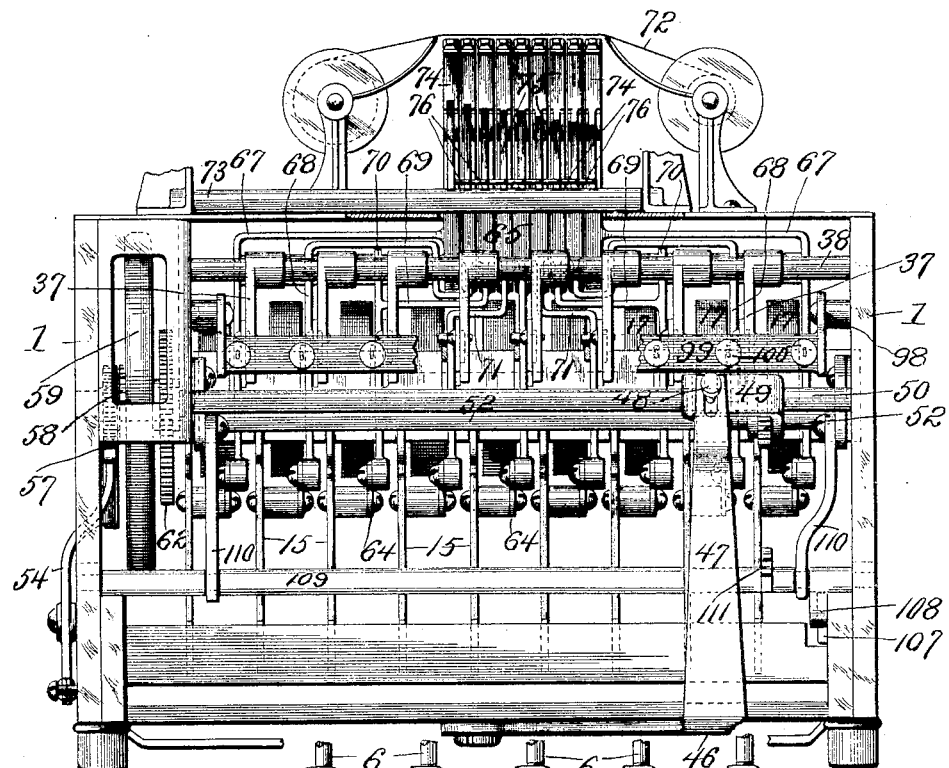
Figure 11:
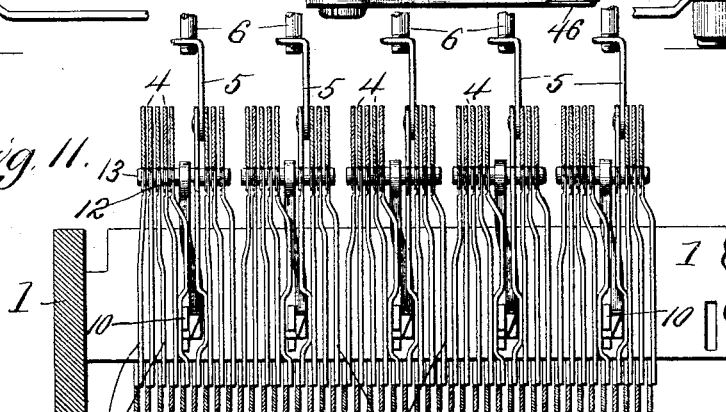

Figure 1 is a side elevational view of my improved machine, the parts being shown in their normal position, the casing and frame of the machine being shown in section. Fig. 2 is a side elevational view showing the lever thrown forward and the position the different parts assume when the lever is in this position. Fig. 3 is a top plan view, a portion of the printing mechanism being removed and part of the keyboard being shown in section. Fig. 4 is a longitudinal sectional view illustrating the front portion of the machine, said view being taken on a line this side of the fifth series of keys. Fig. 5 is a sectional view of the rear portion of the machine, taken on the same line of section, illustrating the position of the rack of the depressed key just before it is engaged by its respective wheel in the adding mechanism. Fig. 6 is a sectional view illustrating the position of the parts when the rack has been engaged by the wheel of the adding mechanism. Fig. 7 is a side elevational view of the rear end of the machine, showing the parts in their normal position. Fig. 8 is a plan view with the key-bars removed, showing the front portion of the machine. Fig. 9 is a continuation of Fig. 8, showing the rear portion of the machine. Fig. 10 is a rear elevational view, a portion of the printing mechanism being omitted. Fig. 11 is a cross-sectional view through the keyboard on line 11 11, Fig. 4. Fig. 12 is a top plan view illustrating the total-key and its connections. Fig. 13 is a side elevational view of the total-key and its connections as seen on line 13 13, Fig. 12. Fig. 14 is a side elevational view of the last snail-wheel to the left, as taken on line 14 14, Fig. 12, showing the stop for said snail-wheel which determines its zero position. Fig. 15 is a view showing an ordinary cam which can be used instead of the snail-wheel. Fig. 16 is a top plan view of the printing mechanism. Fig. 17 is a rear elevational view of said mechanism. Fig. 18 is a view illustrating the different key-bars of a nest. Fig. 19 is a plan view showing the manner of nesting the key-bars of each series. Fig. 20 is a side elevational view of the nest shown in Fig. 19. Fig. 21 is a detailed view illustrating the operation of the transferring mechanism, which coöperates with the adding mechanism. Fig. 22 is a detail plan view of the cam-lever by which the frame of the adding mechanism is depressed. Fig. 23 is a sectional view on line 23 23, Fig. 9. Fig. 24 is a sectional view of line 24 24, Fig. 5. Fig. 25 is a sectional view on line 25 25, Fig. 5.

This invention relates to a new and useful improvement in calculating-machines, the object being to construct a machine of the character described which will add, subtract, divide, and multiply numbers. In subtracting and dividing numbers a special chart or guide is to be used in connection with the machine, but as that forms no part of this present invention I have not illustrated the same, nor will I explain the details, because they are well known and understood by those skilled in the art to which my invention relates. I have, however, shown in addition to the adding mechanism a certain device which is applied to the machine or which forms a part of the machine, by the use of which numbers may be multiplied or square or cube root obtained in a simple and easy manner.

The novel features of this invention are, first, the arrangement and peculiar construction of the key-bars with their actuated racks, in combination with the adding mechanism, whereby the racks are first placed in position before they engage the adding mechanism, thus insuring a proper and positive movement of the adding mechanism from the racks when the operating-lever is actuated; second, the novel construction of the operating-lever in combination with the racks, the keyboard, and the adding mechanism, whereby when the racks are in position said lever will throw the adding mechanism into engagement with the racks and move the racks so as to actuate the adding mechanism while said adding mechanism is in engagement, said lever only releasing the adding mechanism and permitting its disengagement from the racks after the racks have completed their movement; third, the peculiar construction and arrangement of the adding mechanism in combination with a transferring device for transferring the amount added to one adding-wheel, when said amount exceeds nine, to the next adding-wheel; fourth, the peculiar construction and arrangement of the adding mechanism and the use of a cam or snail wheel in connection with said adding mechanism, in combination with the printing-segments, whereby, when desired, a total of the amount contained in the adding mechanism can be obtained at any time without disturbing the adding-wheels; fifth, the peculiar construction of the printing-segments in combination with a pivoted zero-type-carrying device which is automatically thrown into position on all the segments to the right of the one actuated; sixth, the novel arrangement of these pivoted printing-characters on the swinging printing-segments, whereby when any of said segments are operated and said pivoted printing-characters to the right of said operated segments are in position they will not interfere with the operation of the segments to which they are pivoted; seventh, the novel construction and arrangement of the printing-hammer and its operating mechanism; eighth, the peculiar construction of the supporting-frame for this printing-hammer and the paper-feed, whereby the paper to be printed upon, such as the leaf of a book, may be introduced from the side, and, finally, the invention consists in the construction, arrangement, and combination of the several parts of my device, all as will be hereinafter described, and afterward pointed out in the claims.

In the drawings, 1 indicates a suitable frame in which the operating mechanism is mounted. This frame is braced by suitable crossbars and through-bolts and preferably incased by a suitable shell, but as the frame and shell may be changed in different ways and still answer the purposes for which they are designed I will not give a detailed description here of these parts.

2 and 3 indicate two shafts arranged in the front part of the machine, upon which the key-bars 4 are pivoted. The arrangement of these key-bars is more clearly shown in Figs. 3 and 10, where it will be seen that the key-bars for a series of keys—that is, in speaking of a series of keys I mean those keys which bear the numerals from "1" to "9," inclusive—are nested, the nest being preferably divided into two divisions, five of which key-bars of a nest being pivoted on one of said shafts, as 2, while the remaining four of the nest are pivoted on the shaft 3. Each key-bar has connected to it an ear 5, which receives the shank 6 of a key 7, said key being held in its normal position by a spring 8.

Formed on or attached to the key-bars 4 are fingers 9, which with the key-bars form recesses of varying depths, according to the position of the key-bar in the nest of keys and the number on the key attached to that particular key-bar. In other words, a recess in the key-bar to which key "1" is attached is but one-ninth as deep as the recess of the key-bar to which key "9" is attached. The intermediate keys have their recesses graduated between the shallowest and the deepest, as shown in Fig. 18, wherein the key-bar shown at the top of the figure is for key "9," while the key-bar shown at the bottom of the figure is for key "1."

10 indicates sliding bars which I will call "rack-bars," because the racks which engage the adding mechanism are attached to these bars. These bars are slidingly mounted in the frame of the machine beneath the key-bars, and springs 11, attached to said rack-bars and to the framing, tend to force said rack-bars forwardly at all times upon their release.

12 indicates yielding trips which are arranged in front of the rack-bars to hold said rack-bars in their normal rear position. These trips are provided with cross-bars 13 at their upper ends, which engage the key-bars, whereby when said key-bars are depressed the trips are also depressed. The cross-bars 13 are so arranged that one cross-bar includes one nest of key-bars, whereby upon the operation of any one of the keys in a nest said key-bar will actuate this trip and release the rack-bar controlled by the trip. In the drawings there are shown nine series of keys, with which coöperate nine trips, said trips each controlling a rack-bar, of which there are also nine. It will be understood in this connection that while I have shown nine series of keys and nine rack-bars the capacity of the machine could be increased or diminished without departing from the nature and principle of my invention.

Each rack-bar is provided with a cross-bar 14, adapted to coöperate with the recesses in the key-bars forming the nests, that is, these cross-bars 14 are of such dimensions as to include in their path of movement an entire nest of key-bars, as shown in Fig. 8. In this respect they correspond with the cross-bars 13 of the trips 12. Upon the actuation of any key in a series said key will depress its attached key-bar, which, bearing upon the cross-bar 13 of the trip 12, will force said trip out of the path of its rack-bar. The rack-bar being released, its spring 11 will bring it forward until the cross-bar 14 is seated in the recess of the depressed key-bar. By the presence of fingers 9 it is impossible to operate any key in a series after one of the keys in that series has been operated. In Fig. 4 this construction is clearly illustrated, where it will be seen that key "5" has been depressed, releasing the rack-bar, and that the rack-bar has moved forward until its cross-bar 14 has become seated in the recess and its motion arrested. The finger 9 of the key-bar will be under the cross-bar 14 when the key is depressed and the rack-bar moves forward, and will hold said depressed key down until the rack-bar has been returned to its normal position. This enables the operator to determine at any time before the operating-lever is operated what keys have been depressed, and if a mistake has been made the lever may be pulled forward, as will hereinafter be described, and all the key-bars released and the rack-bars restored to their normal position without affecting the adding mechanism.

15 indicates racks on the rack-bars, which racks are adapted to engage wheels in the adding mechanism. These wheels may be in the form of pinions, but I have shown them as half lantern-wheels 16, which wheels are conjoined to numbered disks 17, loosely mounted on a shaft 18, journaled in a frame 19, which is pivoted to the framing 1 at 20.

21 indicates a detaining-pawl which engages the teeth of wheel 16 and serves to center the teeth thereof relative to its respective rack.

22 indicates an operating-lever pivoted on each side of the frame of the machine at 23, thereby extending entirely across the breast of the machine, so that it can be operated by grasping it at any point over the machine. The lower end of this operating-lever has mounted upon it a pivoted dog 24, which is adapted to engage and depress a cam-lever 25, pivoted at 26 to the framing of the machine. This lever 25 and dog 24 are so arranged relative to each other that when the operating-lever is pulled forward the dog 24 will straighten out, as shown in Fig. 2, and depress the lever 25. A rod or wire 27, connected to the dog and to a pivoted handle 28 on the upper end of the lever, is adapted to throw the dog 24 out of operative relation to the lever 25, in order to permit the handle 22 to be pulled forward without operating lever 25, as when a mistake has been made in depressing the wrong keys on the keyboard or it is desired to return the adding mechanism to zero, as will hereinafter be explained.

Connected to the end of lever 25 is a link 29, whose other end is connected to the swinging frame in which the shaft 18 of the adding mechanism is mounted.

From the above it will be seen that by depressing a key on the keyboard, which will release a rack-bar, said rack-bar will move forward until it is arrested, at which time a number of teeth on rack 15 will have passed a point on wheel 16 equal to the number on the key which was depressed. A movement of the lever 22 in a forward direction will rock lever 25 and depress the frame of the adding mechanism until the tooth at the lowest point of wheel 16 will engage the rack-bar.

Upon the forward movement of lever 22 an arm 30, fixed thereto, as shown in Figs. 1, 5, 6, and 9, will, after the dog 24 has engaged the lever 25 and depressed the frame of the adding mechanism, engage a lever 31, pivoted to said arm 30. This engagement is preferably accomplished by means of a lateral projection 32 on the arm 30, which engages the arm 31 after an initial movement has been imparted to the lever 22, during which initial movement the adding mechanism was thrown into engagement with the racks. When the projection 32 engages the lever 31, then said lever 31 becomes part of lever 22, and by reason of a linked connection 33 with a cross-bar 34 will, through the medium of said cross-bar engaging a projection $14^a$ on the rack bar or bars which have been actuated, return said rack-bars to their normal position. This projection $14^a$ on the rack-bar preferably has the cross-bar 14 mounted in its upper end, as shown. This return of the rack-bars is accomplished during the final movement of lever 22, and as the rack-bars are in engagement with the wheels 16 said wheels 16 will be rotated a distance corresponding to the movement of the rack-bars. In Fig. 5 it will be seen that a rack-bar has been moved forward the distance of five teeth, which means that a "5" key has been depressed. In this figure the lever 22 has not yet been operated. When, however, the lever 22 is operated, it first depresses the frame of the adding mechanism so that the teeth of wheel 16 engage the rack-bar. By this time, as shown in Fig. 6, the projection 32 will have engaged the lever 31, and a further movement of lever 22 will, through the movement of cross-bar 34, return the rack and rotate the wheel. These racks in their normal position are so located relative to the wheels 16 that whenever said frame of the adding mechanism is depressed one of the teeth of wheels 16 (the lowest) will engage with the forward recess of the racks. By this construction when the racks are in engagement with the wheels and are returned to their normal position the wheels are never released until the racks have completed their movement. Thus it will be seen that no momentum is imparted to the wheels 16, but, to the contrary, said wheels are brought to a dead-stop and then released.

Whenever by the repeated actuation of any of the wheels 16 said wheels have been made to travel nine-tenths of a complete rotation, it is necessary to transfer the amount added on said wheel to the next higher wheel. I will now describe the manner in which this is accomplished.

Each of the indicating-wheels 17, which are conjoined to wheels 16 and preferably form part thereof, is provided with a projection or tooth 35. 36 indicates what I shall term a "hook-bar," which is pivoted to a rock-arm 37, said arm being mounted upon a shaft 38. The forward end of hook-bar 36 is formed like a hook which normally engages a bar 39, rigidly fixed to the framing of the machine. When the hook is thus in engagement with the bar 39, it is in the path of the tooth or projection 35 on wheel 17, and when said wheel has made nine-tenths of a rotation the projection is in such position that it has engaged and released the hook-bar from the bar 39, in which event a spring 40, attached to rock-arm 38, will cause said hook-bar to be retracted until a projection 41, carried thereby, has engaged the rock-arm 38, as shown in Fig. 6, which projection arrests the rearward movement of the hook-bar and at the same time places a projection 42, depending from the rear end of said hook-bar, in the path of a traveling transfer mechanism, which is operated as follows: When the bar 34 moves to the rear to carry with it the rack-bars, it also engages a projection 44$^a$ in its path, said projection 44$^a$ extending upwardly from a link 44, which is connected to one member 45 of a bell-crank lever, of which the member 46 forms the other part. This bell-crank lever is pivoted beneath a cross-bar of the frame of the machine, located at the front end of the machine, and a spring 46$^a$, connected to the member 46, tends to hold said member to one side of the machine, which we will say is the left-hand side of the machine. As before stated, the engagement of bar 34 with the projection 43 will move said bell-crank lever from the left-hand side of the machine to the right-hand side of the machine. The rear end of member 46 has extending upwardly a projection 47, which engages a stud 48, said stud extending from a frame 49, slidingly mounted on a shaft 50, secured to the framing of the machine. This frame 49 extends forwardly and embraces a grooved shaft 51, mounted in a swinging frame 51$^a$, said frame 49 confining between its members a pinion 52, which is provided with a key running in the groove of shaft 51. This shaft is adapted to be rotated and rotate with it the pinion 52.

The means for causing the rotation of shaft 51 is illustrated in Figs. 2 and 7, where it will be seen that an arm 53 is fixed to lever 22. A pivoted segment 54 is oscillated from said arm 53 by a link 55, said segment being held normally in a forward position by a spring 56. Segment 54 meshes with a pinion 57, to which pinion is conjoined a ratchet-wheel 58, as shown more clearly in Fig. 23.

59 indicates a fly-wheel carrying a pawl 60, which coöperates with the ratchet 58. Conjoined to this fly-wheel is a pinion 61, meshing with a pinion 62, mounted on the end of the shaft 51, upon which the pinion 52 is mounted.

By reference to Figs. 2 and 7 it will be seen that when the operating-lever 22 is moved from the position shown in Fig. 2 to the position shown in Fig. 7 it will, through the medium of arm 53 and link 55, oscillate segment 54 and store up power in spring 56. Immediately that lever 22 is released spring 56 tends to return it to its normal position and by reason of the ratchet-and-pawl connection with the fly-wheel also rotates said fly-wheel positively until the segment completes its forward movement, when said fly-wheel will continue to rotate by reason of its momentum. This actuation of lever 22 will, as we have seen, move the arm 46 of the bell-crank lever to the right-hand side of the machine, and as soon as said lever is released the spring 46$^a$ will act to return the bell-crank lever to its normal position at the left-hand side of the machine, and the pinion 52 will also be rotated. If, as before described, any of the hook-bars have been thrown by the pins 35 on the indicator-wheels 17, said hook-bars will have been moved so that their depending projections 42 are thrown in the path of the frame 49 or a projection 43 extending upwardly from said frame. The two projections just described, contacting with each other, as shown in Fig. 6, will arrest the frame 49 in its movement, and the rotating pinion will engage a tooth or projection on the lower end of rock-arm 38 and force said rock-arm forward, as shown in Fig. 21, restoring the hook-bar to its engaged position relative to the bar 39 and also moving forward a push-bar 63, whose end will engage the teeth of the next wheel 16 and move said next wheel 16 the distance of one tooth. This push-bar 63 is pivoted to the hook-bar, as shown in Figs. 5 and 6, so that upon the completion of its movement, or when restored to its normal position, it will permit the travel of wheel 16 without interruption, said push-bar riding over the teeth of the wheel.

By moving the frame 49 and pinion 52 to the right of the machine said pinion will engage the rock-arms of the units-wheel first, and if by a transfer from the units-wheel the tens-wheel releases its bar the frame 49 will be arrested at the tens rock-arm 38 and carry from the tens-wheel to the hundreds-wheel, and so on along the entire line.

Secured to the rack-bars is a link 64, whose other end engages an arm depending from the printing-segments 65, said printing-segments being pivotally mounted on a shaft 66, arranged across the rear end of the machine. These printing-segments, as shown more clearly in Fig. 10, are nested together, that is, there is no space except that necessary for the easy operation of each segment between the segments. All of the segments extend straight down and are mounted directly upon the shaft 66. As the rack-bars to which the separate or individual segments are connected are distributed practically over the entire width of the machine, it is necessary that a straight and positive connection be made from the rack-bars to the segments.

Referring to Fig. 10, the outer segments extend down and are directly mounted upon the shaft 66, while a cross-piece 67 extends laterally and is mounted upon the shaft 66 near the ends of said shaft, said piece 67 being then extended downwardly and connected to the links 64. The segments next to the outer segments are connected to their respective rack-bars by means of a vertical portion 68, mounted upon the shaft 66 to the inside of the vertical portion of the outer segments, said vertical portion 68 being then bent inwardly and horizontally under the portion 67 and downwardly, affording a bearing on shaft 66, and under the outer segments to the segments next to the outer segments. The next or third segments from the outside are also extended down and have a direct bearing upon shaft 66. A cross-bar 69 connects the lower ends of these segments to vertical portions 70, mounted on the shaft 66 within the line of the vertical portions 68. The next or fourth segments from the outside extend down vertically and have a direct bearing on shaft 66, while the portions of said segment to which the links 64 are connected are formed with a jog or bend 71 to avoid the horizontal portion 69. The fifth segment from the end, being the middle segment of the nest, extends straight down and has but one bearing on the shaft 66.

It is obvious from the above description that any movement of the rack-bar will move the respective segments a corresponding distance, and it is desirable that this relation between the segments and rack-bar be maintained, because the segments are then balanced.

In order to print a zero mark or naught to the right of any number presented to the hammer by any segment, I pivotally mount on said segments a zero-carrying frame, which frame normally rests upon a bar 73 when said frame is not in printing position. In order to clearly describe the construction and operation of these zero-printing frames, I will refer to that part which carries the type as 74 and to that part which rests on the bar 73 as 75. I will assume that the middle segment has been operated so as to present type "5" under the printing-hammer, and in its movement to the rear to accomplish this the arm 75 has passed beyond rod 73, and its end, acting as a cam-face, has raised said arm until its outer face has contacted with a projection 76 on the arm 75 to the right. This will cause the elevation of said next arm, and as this last-mentioned arm is also beneath a pin on the next adjacent arm to the right it will raise said next adjacent arm, the operation being carried out on all of the arms 75 which are to the right of the one actuated, which passes beyond the bar 73, as shown in Fig. 6. These arms 75 are each curved on their outer faces, said curve being described from such a center as will be common to the axis of shaft 66 when said arms are raised, as shown in Fig. 6. By so curving the outer faces of arms 75 it is possible to operate any segment to the right of one previously operated without disturbing the relation of any of the pins and arms, as above described. The elevation of the arms 75 causes the portion 74 to aline itself so that its printing-character "zero" will be in line with the number to be printed. In this connection it might be well to say that the movement of the portion 74 is limited by contacting with the rear end of the printing-segment on which it is pivoted. The normal position of these printing-segments 65 and the pivoted naught-carrying arm 74 is such that a space is left between them, and at any operation of the lever which would not operate any of the printing-segments, but would cause the type-hammer to deliver a blow, such blow would be struck between the segments and their pivoted naught-carrying arms or into space. This construction permits the paper to be spaced without printing characters upon it at every operation of the lever and is useful in dividing columns of figures where it is desired to separate one list of numbers from another. It is also advantageous in that it saves the type and ribbon from unnecessary wear.

When the types are in position, a hammer is operated to force the paper upon which the impression is to be made into contact with the ribbon interposed between said paper and type.

72 indicates the ribbon, 77 the paper to be printed upon, and 78 the hammer for making the impression.

I will now describe how the hammer is operated and how the paper is fed for each impression.

79 indicates a projection extending from the operating-lever 22, to which projection is secured a sliding piece 80. This sliding piece 80 has pivoted to its rear end a dog 81, which is adapted to come in contact with a tappet 82, secured on the end of a shaft 83, upon which shaft a frame 84 is fixed. It is in this frame that the spring on which the type-hammer is mounted is secured. A spring 85 is secured to a stationary part and to the frame 84 for giving force to the blow of the hammer, which blow is made by the resiliency of the hammer-spring, said frame being arrested in its movement to permit this. The operation of the hammer is shown by the dotted lines in Fig. 2, which illustrates the dog raising the tappet and the hammer elevated to a position to deliver the blow. This foward movement of the operating-lever 22 carries with it the sliding piece 80 to accomplish the above, and in order to effect the feed of the paper I mount in said sliding piece a screw 86 or corresponding lug, which engages an arm 87, in which arm is mounted a pawl 88 to operate a ratchet-wheel 89, conjoined to the feed-roller 90. 91 indicates an idle-roller, between which and the roller 90 the feed of the paper is effected. The shaft 83 is supported at its ends by an arm 92, said arm permitting the introduction of the paper to be printed upon from the side, whereby it is possible to print directly upon the leaf of a book. This shaft 83 is also grooved circumferentially, as at 93, with which grooves is adapted to coöperate a spring 94, secured to the frame 95, between whose side bars the feed-roller 90 is arranged. The shaft upon which the feed-roller is mounted is grooved longitudinally and the feed-roller is keyed thereon, which permits said feed-roller being slid longitudinally the shaft with the frame 95. By this construction when a column of figures has been printed and it is desired to print another column on the same sheet or leaf, it is only necessary to move the spring out of its notch and to slide the feed-roller 90 and frame 95 longitudinally the shaft until the spring 94 engages with the other recess 93. Of course, as but one means is shown for feeding the paper in but one direction, the book would also have to be moved back, so that the figures of the new column would start at the top of the page and the page then gradually fed onward.

I have not shown any means for automatically feeding the ribbon, because such is a common expedient, and there are many forms of ribbon-feed which could be employed with success.

I have described the operation of the machine for recording, adding, and printing, for it will be understood that the "transfer mechanism," as I have termed it, will add each number printed to the sum total as indicated by all of the indicating-wheels, while the printing-segments will print each number separately.

I will now describe how the total, as indicated by the adding-wheels, is printed by the printing-segments.

Projecting up from the keyboard at some convenient point, preferably at the left-hand side of the keyboard, is a total-key 96, said total-key having connected to it the end of a lever 97, which lever is pivoted at 98 to the framing of the machine. The rear end of lever 97 carries a cross-bar 99, which cross-bar is perforated or formed with openings for the passage of stop-bars 100, which are formed with heads at their rear ends, between which and the bar 99 are interposed springs whose tension is directed to constantly keep the bars 100 in their rear position. A shoulder on the bars 100 is adapted to contact with bar 99 to determine this rear position. The forward ends of the bars 100 pass through openings or grooves in the bar 39 and are in line with snail-wheels 101, conjoined to the wheels 16 and 17. The peripheries of these "snail-wheels," as I call them, are divided into ten divisions, each of which ten divisions is described from the same center or shaft 18, but on different radii.

I do not wish to be understood as limiting myself to the exact construction of the snail-wheels shown and described, as it is obvious that a smooth cam 101$^a$, having a regular graded surface, as shown in Fig. 15, would perform the same function. The lower portions or members of the printing-segments 65, to which the links 64 are connected, are provided with pins or projections 102, which are adapted to engage shoulders 103 on the stop-bars 100. The total-key before referred to has connected to it also a rock-arm 104, pivoted at 105 in the framing of the machine, said rock-arm 104 being duplicated on each side of the machine and carrying a bar 106, which is adapted, when said total-key is depressed, to depress all of the trips 12 and release all of the rack-bars in the machine. When the total-key is depressed, its first movement is to elevate the bar 99 and throw the shoulders 103 of the stop-bars 100 in front of the pins or projections 102 on the lower members of the printing-segments. A continued movement of the total-key will cause all of the trips to release all of the rack-bars, as above described, when said rack-bars will move forward and carry with them the lower portions of the printing-segments. The shoulders 103 of the bars 100 being now elevated in the path of pins 102 will also be carried forward until the forward ends of the stop-bars 100 are arrested by the snail-wheels, which determine the position of the printing-segments and cause the character presented under the hammer to represent the step on the snail-wheel with which the stop-bar 100 engages. The lever 22 is now pulled forward and through the medium of the mechanism before described will cause the hammer to deliver a blow. This movement of the lever 22 will actuate the adding-wheels in the manner heretofore described—that is, the wheels 16 will be made to engage with the racks 15 unless the lever 28 is moved so as to operate the dog 24 through the medium of the rod 27, which will elevate said dog so that it will not engage the lever 25 to depress the frame of the adding mechanism. In this manner the total can be obtained without disturbing the adding mechanism.

If it is desired to restore the adding-wheels to a zero position, the lever 22 is moved forward a short distance until the adding-wheels have engaged the rack-bars. The lever 22 is held in this position and the total-key depressed, or, what would be an equivalent here, all of the "9" keys operated. The release of all of the rack-bars would cause them to move forward and impart a reverse rotatory movement to the adding-wheels which would continue until the pins 35 were arrested by striking on top of the hook-bars, which would establish a zero position of all of the adding-wheels. After this is done, which takes but little time, the lever 28 is operated to disengage the adding-wheels from the racks, and the lever 22 is moved forward to complete a full operation, which, as above described, would restore the rack-bars to their normal position. It is obvious that as there is no hook-bar necessary for the last adding-wheel at the left some provision must be made to stop said wheel in its reverse movement. I have shown a stop 36$^a$ yielding in one direction to permit the pin 35 to pass, as in its ordinary operation, said stop or "pawl," as it might be called, arresting said wheel in its reverse operation and causing it to stop at zero, as shown in Fig. 14.

Whenever the lever 22 is actuated and it causes a movement of bar 34 to the rear, said bar, near the completion of its movement, will come in contact with a sliding bar 107, arranged at the side of the machine, which bar 107 coöperates with a lug 108, extending from rock-shaft 109, arranged at the rear end of the machine. This rock-shaft 109 operates a link 110, which is connected to the frame in which the shaft 51 is mounted. The attachment of rods 110 to the shaft 109 is to one side of the center, so that whenever the sliding bar 107 is moved to the rear by the engagement of the cross-rod 34 therewith said shaft 109 is thrown upwardly, as shown in Fig. 6, so that the connection of link 110 is past dead-center. By this means the frame in which shaft 51 is mounted and the frame 49, mounted on shaft 50, are each moved upwardly on the principle of a toggle-joint.

111 indicates a toothed arm extending from the shaft 109 into the path of pinion 52, as shown in Fig. 6. A spring 107$^a$ is secured to the sliding bar 107 and to the frame of the machine, said spring exerting its tension to pull said bar forwardly at all times. When the lever 22 is released and permitted to go back to its normal position, said bar 107 will be moved forwardly, and, after the pinion 52 has completed its work of transferring the numbers from one adding-wheel to another, its final operation is to engage the teeth on the end of arm 111, throwing said arm rearwardly, as shown in Fig. 5, so that the pinion will drop out of the path of any hook-bars which may have been operated between the travels of the pinion. The object of this is to throw the pinion 52 out of the path of the projections 42 by causing the depression of the frames 49 and 51$^a$. This lowering of the pinion 52 and its shaft 51 occurs only when the pinion is idle and is being moved from its position at the left of the machine to its position at the right of the machine, where, by the time the pinion has reached said "right" position, the lever 22 will have completed its forward movement, stored up power in the spring 56, and caused the bar 107 to operate the projection 108 to throw the pinion 52 into an operative position. When the pinion completes its movement from right to left, actuating the different adding-wheels in its path through the medium of the hook-bars and their associate parts and reaches its position at the left of the machine, it will throw the arm 111 down and will then be in an inoperative position until moved to the right side of the machine, when the above operation will be repeated.

In the above description I have referred only to the mechanism used for the purposes of keeping a total of the amounts recorded, such as in the adding-wheels, the mechanism for printing each separate amount recorded, such as the printing-segments and their associated parts, and the mechanism by which the total of the amounts recorded and of the items printed could be obtained.

I will now describe the mechanism whereby it is possible to multiply any number by another.

Pivoted at 112 to the framing of the machine is a lever 113, which is provided at its upper end with a yielding detent which engages a sector 114, said sector being notched to coöperate with the yielding detent of the lever 113. The lower end of this lever is slotted to receive a pin secured to a sliding bar 115, which sliding bar supports a detaining-bar 116, there being preferably two of said sliding bars 115, arranged one on each side of the machine and connected by a cross-rod 117 at their rear ends. 118 indicates links which are connected to the key-bars 4 and to detaining-fingers 119, pivoted on a rod 120 at the front end of the machine. Secured to the lever 113 is a sliding rack-bar 121, which is adapted to move with said lever when said lever is placed in its desired position, said rack-bar being operated upon by suitable mechanism actuated from the lever 22 to return the lever 113 to its normal position. This is accomplished as follows: An arm 122, extending from the lever 22, is provided with an inwardly-projecting pin or lug 122$^a$ on its outer end, which pin is adapted to come in contact with and operate a pivoted lever 123, said lever 123 being pivoted to the frame of the machine and normally held against a stop 124 by a spring 125. The forward end of this lever carries a pawl 126, whose rear end engages with the teeth of rack-bar 121, while its forward end is concaved and coöperates with a stop-pin 127, mounted upon the lever 113. The operation of this mechanism is as follows: When the keys are depressed, as shown in Fig. 4, they also depress their attached detaining-fingers 119. Assuming now that it is desired to multiply a number indicated by the depressed keys by any number within the scope of the number of notches on the sector 114, the handle 113 is moved to the rear, so that its spring-detent engages with that notch, for illustration the ninth notch from the front end of the sector, as shown. This movement of the lever 113 to the rear will cause its detaining-bar 116 to move forwardly over the detaining-fingers of the depressed keys, as shown, keeping said keys depressed until the detaining-bar will have moved to the rear a sufficient distance to release said fingers. When the handle 22 is moved forwardly, the operation of the machine, as before described, will result, and in addition to said operation the handle will operate the lever 113 by the engagement of the pawl 126 with the rack 121. This is done by the engagement of the pin 122$^a$ on arm 122, which strikes the lever 123 when the lever 22 is nearing its return stroke, which causes the pawl 126 to move to the rear and the detent engaging with the notch in the sector to move forward and engage the next notch in advance. When the operating-lever 22 completes its movement to the rear, under ordinary circumstances—that is, when the lever 113 is idle—the trips 12 would hold the rack-bars in their normal position, but as the trips are inoperative by reason of the depression of the keys, said rack-bars, when the frame of the adding mechanism is permitted to be elevated and the racks become disengaged therefrom, will move forward again to a position corresponding to the same position when the keys were first depressed. Another operation of the lever 22 will move the lever 113 another notch forward, and so on will this operation be repeated until the lever 113 reaches the last notch, when the detaining-bar 116 will have released the detaining-fingers 119 and the keys are permitted to rise. In Fig. 2 I have shown the parts in such position that the detaining-bar is just ready to leave the detaining-fingers, the lever 113 being in the second notch on the sector.

By the above construction it will be readily seen that any number may be repeated as many times as desirable, said number being added in the adding mechanism and printed. When the number has been repeated the number of times indicated by the primary position of the detent relative to the sector, the parts will be restored to their normal position. Of course any operation of the lever 22 after the detaining-bar has released the detaining-fingers will have no effect on the several mechanisms in the machine, except to depress the frame of the adding mechanism and to move the transfer mechanism laterally; but as these are inoperative at this time it may be said that the machine is now idle.

The use of the above construction in multiplication is obvious, as is illustrated by the following example, wherein 9673 has been multiplied by 321.

```
      9673
     96730
     96730
    967300
    967300
    967300
   -------
   3105033
```

The operation of the machine in performing this example is as follows: 9673 is depressed on the keyboard, and being multiplied by one the lever 113 is not actuated, but the machine performs the ordinary operation of recording that number. The next depression of the keyboard is 96730, the zero being automatically placed in position. The lever 113 is now moved to the second notch and the operating-lever is actuated twice. After this number has been placed in the machine, 9673 is moved another figure to the left and the keys will now represent 967300. The lever 113 is now moved to the third notch and lever 22 actuated accordingly. When the total is struck, it will exhibit 3105033, the sum total of the example or the result of these several additions, of which multiplication is but a modified form.

I am aware that many minor changes in the construction, arrangement, and combination of the several parts of my machine can be made and substituted for those herein shown and described without in the least departing from the nature and principle of my invention.

Having thus described my invention, what I claim, and desire to secure by Letters Patent, is—

1. The combination with the adding mechanism, series of keys, and a series of rack-bars, one rack-bar being common to a series of keys, said rack-bars acting upon the adding mechanism, the keys releasing the rack-bars initially so that they occupy varying positions, depending upon the position of the operated key in its series, of a cross-bar cooperating with the rack-bars, and means for moving said cross-bar to restore the rack-bars to their normal position, which restoration of the rack-bars actuates the adding mechanism; substantially as described.

2. The combination with the adding mechanism, of a series of independently-operated rack-bars coöperating therewith, keys, means connected to, and operated by the keys, for determining an initial movement of the rack-bars, a lever for throwing the adding mechanism into engagement with the rack-bars after the rack-bars have completed their initial movement, and a cross-bar connected to, and operated by, said lever, for engaging the rack-bars and restoring them to their normal position, thereby actuating the engaged adding-wheels proportionately to the initial movement of the rack-bars; substantially as described.

3. The combination with a keyboard, of rack-bars which are controlled thereby, means for retaining the keys in a depressed position after said keys release the rack-bars, an adding mechanism with which said rack-bars engage, and means for moving the rack-bars to engage and operate the adding mechanism, said means also releasing the keys, and resetting the rack-bars; substantially as described.

4. The combination with a keyboard, of trips which are operated by said keys, rack-bars which are controlled by said trips, springs for moving said rack-bars forwardly, and means on the rack-bars and key-bars coöperating with each other, to determine the movement of the rack-bars, depending upon the position of the depressed key in its series; substantially as described.

5. The combination with keys which are arranged in series, of key-bars formed with stops whose location is determined by the position of the keys in their series, and rack-bars provided with abutments coöperating with said stops when the keys are depressed; substantially as described.

6. The combination with a key which is provided with a stop and a finger-like projection, of a rack-bar, and a cross-bar on the rack-bar, which is adapted to coöperate with said stop and finger; substantially as described.

7. The combination with the adding mechanism, of a series of independently-operated rack-bars coöperating therewith, keys, means connected to, and operated by the keys, for determining an initial movement of the rack-bars, means for engaging the rack-bars with the adding mechanism after such initial movement has been completed, and restoring the rack-bars to their normal positions, which restoration of the rack-bars, actuates the engaged adding-wheels proportionately to the initial movement of the rack-bars, and devices for retaining the keys in a depressed position until the rack-bars have been restored; substantially as described.

8. The combination with a keyboard whose keys are arranged in series, of key-bars which are nested for each series of keys, said nest being divided and pivoted on different shafts, recesses of varying depth in said key-bars, the bottoms of said recesses forming retaining-fingers, and rack-bars provided with cross-bars for coöperating with said recesses and fingers; substantially as described.

9. The combination with a series of keys, of key-bars which are nested, a trip which is adapted to be operated by any of the keys in that nest, and a rack-bar which is controlled by said trip; substantially as described.

10. The combination with a series of keys whose key-bars are nested and formed with recesses of varying depths, of a trip which is adapted to be operated by any one of said key-bars, a rack-bar controlled by said trip, and a cross-bar on the rack-bar, which is adapted to coöperate with recesses in any one of the key-bars of said nest; substantially as described.

11. In a calculating-machine the combination with a keyboard which is provided with keys arranged in series, the key-bars of said series being nested, a trip for each nest of key-bars, a rack-bar which is controlled by said trips, and cross-bars on the rack-bars which coöperate with recesses in the key-bars of the nest, which controls the trips, substantially as described.

12. The combination with series of keys, of rack-bars one of which bars is common to each series of keys, means controlled by the keys, whereby, upon the operation of any key in a series is initially moved a predetermined distance, an adding mechanism which is normally out of engagement with the rack-bars, and means for throwing the said adding mechanism into engagement with the rack-bars, said means also returning the rack-bars to their normal position, and actuating the adding mechanism proportionately to the initial movement of the rack-bars, said adding mechanism being disengaged from the rack-bars after the rack-bars have completed their final movement, substantially as described.

13. The combination with series of keys, of rack-bars one of which bars is common to each series of keys, means controlled by the keys, whereby, upon the operation of any key in a series, the rack-bar common to that series, is initially moved a predetermined distance, an adding mechanism which is normally out of engagement with the rack-bars, and means for throwing said adding mechanism into engagement with the rack-bars, said means also returning the rack-bars to their normal position, and actuating the adding mechanism proportionately to the initial movement of the rack-bars, said rack-bars being of such length that the adding mechanism is not disengaged therefrom until said rack-bars have completed their final movement, whereby the adding mechanism is in positive mesh with the rack-bars until said rack-bars are stationary; substantially as described.

14. The combination with rack-bars, of an adding mechanism mounted in a swinging frame, and an operating-lever for depressing said swinging frame so that said adding mechanism will be thrown into engagement with the rack-bars, said lever moving the rack-bars after such engagement has been established, and releasing the swinging frame of the adding mechanism upon the completion of the movement of the rack-bars; substantially as described.

15. The combination with rack-bars, of an adding mechanism, a swinging frame in which said mechanism is mounted, an operating-lever, a dog on the end of the operating-lever, a lever having a cam-face and connected to the swinging frame by a link and means for throwing said dog into an inoperative position, whereby the swinging frame will not be actuated, substantially as described.

16. The combination with rack-bars, of an adding mechanism, a swinging frame in which said mechanism is mounted, a lever having a cam-face and connected by a link to said swinging frame for operating said frame, and an operating-lever for engaging said cam-face for throwing the adding mechanism into engagement with the rack-bars, said operating-lever also moving the rack-bars to actuate said adding mechanism when said engagement is effected; substantially as described.

17. The combination with rack-bars which are adapted to be initially moved a predetermined distance, an adding mechanism which is normally out of engagement with the rack-bars, a swinging frame, in which said adding mechanism is mounted, and an operating-lever for depressing said swinging frame and throwing the adding mechanism into engagement with the rack-bars after the rack-bars have completed their initial movement, said lever also returning the rack-bars to their normal position; and actuating the adding mechanism proportionately to the initial movement of the rack-bars, said lever permitting the swinging frame to rise and carry the adding mechanism out of engagement with the rack-bars, when said rack-bars have completed their final movement; substantially as described.

18. The combination with a keyboard whose keys are divided into series, the key-bars of each series being nested, of a trip for each nest of key-bars, a rack-bar which is controlled by each trip, said rack-bars coöperating with a nest of key-bars, an adding mechanism consisting of independent adding-wheels, mounted on a common shaft, and means for throwing all of said adding-wheels into engagement with their respective rack-bars, said means also causing a return movement of such rack-bars as have been actuated, whereby, each rack-bar operates its respective adding-wheel proportionately to the initial movement of the rack-bar; substantially as described.

19. The combination with a series of keys, of key-bars for each series which are nested, a trip controlled by the key-bars of each nest, a rack-bar controlled by each trip, said rack-bars having cross-bars which coöperate with recesses in the key-bars of their respective nests, whereby a predetermined initial movement of the rack-bars is effected, adding-mechanism wheels mounted on a common shaft and which are adapted to be thrown into engagement with their respective rack-bars when said rack-bars have completed their initial movement, an operating-lever for effecting such engagement, said lever also returning the rack-bars to their normal position and disengaging the adding-wheels from the rack-bars when the rack-bars have reached their normal position; substantially as described.

20. The combination with an adding mechanism, of a transferring device which travels alongside of the adding mechanism, said transferring device starting at one end and traveling along the entire length of the adding mechanism to the other end, said device successively operating one or more adding-wheels in its travel, substantially as described.

21. The combination with an adding mechanism, of a traveling frame arranged in juxtaposition thereto, and a device carried by said frame for engaging and actuating the adding-wheels, substantially as described.

22. The combination with an adding mechanism, composed of independent adding-wheels, of a traveling mechanism adapted to travel the length of said adding mechanism and transfer numbers from one wheel to another; substantially as described.

23. The combination with an adding mechanism, composed of independently-actuated adding-wheels, of a trip which is adapted to be actuated by said adding-wheels, and mechanism which travels along the adding mechanism for coöperating with said trip to actuate the next adding-wheel in advance; substantially as described.

24. The combination with an adding mechanism composed of independently-operated wheels, of trips which are actuated by said wheels, a shaft arranged along the entire length of the adding mechanism and to one side thereof, a frame slidingly mounted on said shaft, and traveling longitudinally thereof, and means carried by said frame for coöperating with the trips to actuate the adding-wheels, substantially as described.

25. The combination with an adding mechanism, composed of independently-actuated wheels, a pin or projection on each of said wheels, a trip in the path of said pin, a traveling pinion, means for arresting said pinion in its travel when a trip is thrown, and a push-bar which is actuated by said pinion, when arrested, to actuate the next adding-wheel in advance; substantially as described.

26. The combination with an adding mechanism, composed of independently-actuated wheels, a pin or projection on each of said wheels, a hook-bar in the path of said wheels, a traveling pinion, a projection on the hook-bar for arresting said pinion in its travel when said hook-bar has been thrown by the pin on the adding-wheel, and a push-bar pivoted to the hook-bar, which push-bar is actuated by the arrested pinion to throw the next adding-wheel in advance; substantially as described.

27. The combination with an adding mechanism, composed of independently-actuated wheels, a pin or projection on each of said wheels, a hook-bar for each wheel in the path of said pin, a projection on said hook-bar, a push-bar pivoted to the hook-bar, a swinging arm to which said hook-bar is pivoted, and a traveling pinion which is arrested by the projection on the hook-bar, said pinion engaging the swinging arm, when so arrested, to throw the push-bar; substantially as described.

28. The combination with an adding mechanism, composed of independently-actuated wheels, of hook-bars which are adapted to be tripped by said wheels at each revolution thereof, pivoted arms upon which said hook-bars are mounted, push-bars pivoted to the hook-bars, and a traveling pinion which is adapted to engage said swinging arms and restore the hook-bars to their normal position after being tripped, the restoration of said hook-bars causing the push-bars to actuate the next adjacent adding-wheels in advance; substantially as described.

29. The combination with rack-bars which are adapted to be initially moved a predetermined distance, of an adding mechanism, composed of independent wheels, which are adapted to engage the rack-bars after said rack-bars have been initially moved a predetermined distance, a lever for returning said rack-bars to their normal position and actuating the adding-wheels proportionately to the initial movement of their respective rack-bars, a traveling mechanism which is adapted to transfer numbers from one adding-wheel to the next in advance, said operating-lever placing said traveling mechanism in position and storing up power for operating the same; substantially as described.

30. In a calculating-machine, the combination with an adding mechanism, of a transferring device which is adapted to travel the length of said adding mechanism, and an operating-lever for placing said transferring device in position to operate upon the adding mechanism, and at the same time, store up power in said traveling device, whereby, the adding mechanism is operated; substantially as described.

31. The combination with an adding mechanism, of a transferring device which is adapted to coöperate therewith, said transferring device traveling along the adding mechanism, an operating-lever for storing up power for said transferring device, and a fly-wheel whose momentum is utilized to operate the transferring device after the stored-up power has become exhausted; substantially as described.

32. The combination with an adding mechanism, of a laterally-traveling transferring device, which is adapted to coöperate therewith, an operating-lever for storing up power for said transferring device when said lever is moving in one direction, said power becoming active when the lever is moving in an opposite direction, and connected mechanism between said power and transferring device; substantially as described.

33. The combination with an adding mechanism, of a transferring device, an operating-lever, and connections between said operating-lever and transferring device, said connections comprising a segment which is operated by said lever, a spring, a pinion meshing with the segment, fly-wheel, and a pawl-and-ratchet mechanism between said pinion and fly-wheel; substantially as described.

34. The combination with an adding mechanism, of a transferring device, comprising a rotatory member which travels along a grooved shaft, and means for rotating said shaft, said means also causing the travel of the rotary member; substantially as described.

35. The combination with an adding mechanism, of a transferring device, a pinion for operating said transferring device, a grooved shaft upon which said pinion is mounted, an operating-lever, a bell-crank lever which is actuated by said operating-lever for throwing the pinion from one side of the machine to the other, and a spring, connected to said bell-crank lever for returning the pinion to its normal position relative to the shaft upon which it is mounted; substantially as described.

36. The combination with an adding mechanism, of a transferring device, a pinion for operating said transferring device, a grooved shaft upon which said pinion is mounted, a bell-crank lever for moving said pinion from one end of the shaft to the other, a spring for returning said bell-crank lever and pinion to their normal position, mechanism for rotating said grooved shaft, and an operating-handle for operating said bell-crank lever and shaft-driving mechanism; substantially as described.

37. The combination with an adding mechanism, of a transferring device, a pinion or notched wheel which is included in said transferring device, a grooved shaft upon which said pinion is mounted, a bell-crank lever for sliding said pinion along its shaft, means for rotating said shaft and pinion, and an operating-lever for moving the bell-crank lever and also storing up power for the means which rotates the pinion and shaft; substantially as described.

38. The combination with an operating-lever, of a cross-bar connected thereto, a bell-crank lever which is operated by said cross-bar, an adding mechanism, a transferring device for the adding mechanism, a pinion for operating the transferring device, a grooved shaft, upon which said pinion is mounted, and means controlled by the operating-lever for rotating the shaft and pinion when the bell-crank lever and pinion are returning to their normal position; substantially as described.

39. The combination with an adding mechanism, of a transferring device, and means for actuating said transferring device, said means traveling along the adding mechanism and being in operative position when moving in one direction only; substantially as described.

40. The combination with an adding mechanism, of a transferring device, an operating-lever, and connections between said transferring device and operating-lever for throwing said transferring device out of operative position, relative to the adding mechanism when said lever is moving in one direction; substantially as described.

41. The combination with an adding mechanism, of a transferring device, which is adapted to travel along said adding mechanism, an operating-lever, and means, controlled by said operating-lever, for rendering the transferring device inoperative, said means also throwing said transferring device into operative relationship to the adding mechanism, the operating-lever storing up power to actuate said transferring device when it is in an operative position, relative to the adding mechanism; substantially as described.

42. The combination with an adding mechanism, of a transferring device which includes a pinion mounted upon a grooved shaft, a swinging frame in which said shaft is mounted, an operating-lever, means for rotating said pinion and moving it longitudinally the grooved shaft, and connections between said operating-lever and swinging frame for actuating said frame when the lever is in certain of its positions; substantially as described.

43. The combination with an adding mechanism, of a transferring device in which is included a pinion which travels along a grooved shaft, a swinging frame in which said shaft is mounted, an operating-lever, a sliding bar which is adapted to be operated by said operating-lever, a rock-shaft which is operated by said sliding bar, a link connection between said rock-shaft and swinging frame, and means controlled by the traveling pinion for operating said rock-shaft to throw the pinion out of operative relation to the adding mechanism; substantially as described.

44. The combination with an operating-lever, of a sliding bar which is adapted to be operated upon the movement of said lever, a spring connected to said sliding bar, a rock-shaft adapted to be actuated by the movement of said sliding bar, a toothed arm carried by said shaft, a swinging frame, a link connection between said swinging frame and rock-shaft, whereby, when said rock-shaft is actuated by the sliding bar, said link is carried past dead-center, an adding mechanism, a transferring device in which is included a grooved shaft, mounted in the swinging frame, and a pinion, which is adapted to travel along said shaft and coöperate with the toothed arm of the rock-shaft to cause the lowering of the swinging frame; substantially as described.

45. The combination with series of independently-movable keys, of rack-bars, one of which bars is common to a series of keys, a series of independently-movable printing-segments connected to, and operated by, their respective rack-bars, an adding mechanism comprising independently-movable adding-wheels which engage the rack-bars, said parts being so arranged that, when a key of a series is operated, it initially moves the rack-bar to set its connected printing-segment in position, and means for engaging the initially-moved rack-bar with the adding-wheel and restoring said rack-bar and printing-segment to their normal positions, the movement of restoring said parts actuating the adding mechanism; substantially as described.

46. The combination with printing-segments carrying type on their peripheries, and pivoted sections mounted upon said segments, said sections also carrying type; substantially as described.

47. The combination with printing-segments carrying type on their peripheries, of pivoted sections mounted upon said segments, said pivoted sections also carrying type, and means for operating said pivoted sections upon the movement of the printing-segment, whereby a naught-type will be thrown into printing-line to the right of any actuated segment; substantially as described.

48. The combination of printing-segments carrying type on their peripheries, of a pivoted section carrying a naught-type, said naught-type being normally out of the printing-line, and means for throwing all of said naught-type into printing-line to the right of any actuated segment, substantially as described.

49. The combination with printing-segments, of pivoted sections carrying naught-type, and pins or lugs on the ends of said pivoted sections, which extend over the next adjacent section; substantially as described.

50. The combination with printing-segments, of pivoted sections carrying naught-type which normally rest upon a support, the rear arms of said sections being curved so that when the segments are actuated, the arms will be moved to one side of said support; substantially as described.

51. The combination with printing-segments, of pivoted sections, carrying naught-type, the rear arms of said sections normally resting upon a support which forces said arms upwardly when a segment is operated, and a lateral projection on each of said arms, whereby, when one segment is operated, the arm carried thereby will be elevated, which, in turn, elevates the remaining pivoted arms to the right thereof; substantially as described.

52. The combination with printing-segments, of sections pivoted thereto carrying naught-type, the rear portions of said sections being formed as curved arms, the inner faces of which are all described from a circle of which the axis of the segment is the center, the outer faces of said arms being also described from the same center, lateral projections at the ends of said arms which extend over the next adjacent arm and a support upon which said arms normally rest, whereby, when any of said segments are operated, all of the pivoted arms to the right thereof will also be operated, the curved outer faces of said arms being described from a circle having the axis of the printing-segment as its center when said arms are elevated, permitting any of the printing-segments to the right of the one first operated, to be operated without disturbing the position of the arms; substantially as described.

53. The combination with an operating-lever, of a slide-bar connected thereto, a pivoted dog on such slide-bar for operating the type-hammer, a pawl-carrying arm, a pawl mounted thereon, a ratchet-wheel, a feed-roll conjoined to said ratchet-wheel and a lug on said slide-arm for operating said pawl-carrying arm so that after the type-hammer has delivered its blow said lug will strike the pawl-carrying arm, and feed the paper, substantially as described.

54. The combination with a series of printing-type mounted on segments which are grouped together, of a type-hammer stationarily mounted relative to said type, means for moving the segments to present different type under the type-hammer, a notched rock-shaft upon which the type-hammer is mounted, a paper-carrying frame slidingly mounted upon said shaft, and a latch on said frame for engaging the notches of the shaft, whereby the frame is laterally adjustable relative to the type-hammer, substantially as described.

55. The combination with a notched rock-shaft, of a type-hammer carried thereby, a frame mounted upon said shaft and a spring arranged on said frame and adapted to engage the notches in the rock-shaft to hold the frame in an adjusted position; substantially as described.

56. The combination with an adding mechanism, of cam-wheels, printing-segments, and means coöperating with said cam-wheels to determine the position of the printing-segments when it is desired to print the total amount in the adding mechanism; substantially as described.

57. The combination with an adding mechanism, composed of independently-actuated wheels, cam-wheels conjoined to said adding-wheels, printing-segments and means coöperating with the cam-wheels and printing-segments for alining the type on the printing-segments to correspond with the amount contained in the adding mechanism; substantially as described.

58. The combination with an adding mechanism, composed of independently-actuated wheels, of cam-wheels conjoined to the adding-wheels, printing-segments, and stop-bars which are adapted to abut against said cam-wheels to determine the position of the printing-segments; substantially as described.

59. The combination with an adding mechanism, of cam-wheels carried thereby, stop-bars adapted to abut against said cam-wheels, a shoulder on each bar, and printing-segments provided with pins which are adapted to coöperate with said shoulders; substantially as described.

60. The combination with the keyboard, of an adding mechanism, cam-wheels in said adding mechanism, rack-bars, a total-key which is adapted to release all of said rack-bars, printing-segments which are connected to said rack-bars, and stop-bars which are adapted to be engaged by the printing-segments and be forced against the cam-wheels when the total-key is operated, to determine the position of the printing-segments; substantially as described.

61. The combination with the keyboard, of rack-bars, controlled thereby, printing-segments connected to said rack-bars, an adding mechanism containing cam-wheels, stop-bars which are adapted to be forced against said cam-wheels when the printing-segments are operated, springs for normally holding the said stop-bars away from the cam-wheels and a total-key for releasing all said rack-bars and throwing the stop-bars, which coöperate with the cam-wheels, into position to be engaged by the printing-segments; substantially as described.

62. The combination with a total-key, of a cross-bar connected thereto, rack-bars to which the printing-segments are connected, trips for said rack-bars which trips are adapted to be thrown when the total-key is operated to release all of the rack-bars, a swinging frame carrying stop-bars which frame is also operated to throw said stop-bars into engagement with the printing-segments when said total-key is operated, an adding mechanism, printing-segments, and cam-wheels in the adding mechanism with which said stop-bars coöperate after they are engaged by the printing-segments; substantially as described.

63. The combination with rack-bars, springs for forcing said rack-bars forwardly, an adding mechanism, cam-wheels in the adding mechanism, printing-segments, stop-bars which are adapted to engage the printing-segments and be forced against the wheels, and springs which exert a tension to force said stop-bars away from the cam-wheels, the springs of the rack-bars being master-springs, by which the stop-bar springs are compressed; substantially as described.

64. The combination with the keyboard of a calculating-machine, of the operating-lever, and a device which is adapted to be operated after the keys are depressed to retain the keys in their depressed position until two or more operations of the operating-lever have been performed; substantially as described.

65. The combination with the keyboard of a calculating-machine, of a notched sector, a lever having a yielding detent for coöperating with the notches in said sector, means carried by said lever for retaining the keys in a depressed position and an operating-handle for operating said lever at each operation of the handle; substantially as described.

66. The combination with the keyboard of a calculating-machine, of a notched sector, a lever coöperating with said sector, a detaining-bar carried by said lever for coöperating with the detaining-fingers of the keyboard, a rack-bar carried by said lever, a pawl in engagement with said rack-bar, and an operating-lever for moving said pawl at each operation; substantially as described.

67. The combination with the keyboard of a calculating-machine, in which keyboard are included retaining-fingers, of a retaining-bar, which coöperates with said retaining-fingers in said keyboard, an operating-handle and connected mechanism between said retaining-bar and the operating-handle, whereby, at each operation of said handle, said retaining-bar is moved a step, the final step releasing the retaining-fingers and permitting the keys to rise from their depressed position; substantially as described.

68. The combination with the key-bars, of detaining-fingers carried thereby, a detaining-bar which is adapted to coöperate with said fingers, a lever for moving said bar into and out of engagement with the fingers, an operating-handle, and means operated by said handle for imparting a step-by-step movement to the detaining-bar until the same has released the detaining-fingers of the key-bars; substantially as described.

69. The combination with the key-bars, of detaining-fingers carried thereby, a detaining-bar, a lever to which said bar is connected, a rack-bar connected to the lever, a pawl which is adapted to coöperate with said rack-bar, a pawl-carrying lever, and an operating-handle which actuates said pawl-carrying lever in certain of its positions, substantially as described.

70. A key-bar for calculating-machines which is adapted to be pivoted at one end, a recess forming a stop, and a finger which forms the lower wall of said recess; substantially as described.

71. The combination with printing-segments carrying type on their peripheries, of type-carrying sections pivotally connected to said segments, the type on said pivoted sections normally occupying a position some distance away from the type of the segments, thereby providing a space between the two, and a type-hammer which is so arranged as to strike in said space when the printing-segments and their connected type-carrying sections are in a normal position; substantially as described.

72. The combination with printing-segments carrying type on their peripheries, of type-carrying sections pivotally connected to said segments, the type on said pivoted sections normally occupying a position some distance away from the type of the segments, thereby providing a space between the two, a type-hammer which is so arranged as to strike in said space when the printing-segments and their connected type-carrying sections are in a normal position, mechanism for moving said segments so that they will present type in the path of the type-hammer, and means for moving all of the pivoted segments to the right of an actuated segment, to fill up the space before mentioned, so that said pivoted sections will present their type to the type-hammer and make a printing-line in which the type on the actuated segments are included; substantially as described.

In testimony whereof I have affixed my signature, in presence of two witnesses, this 5th day of September, 1896.

DE KERNIEA J. T. HIETT.

Witnesses:
F. R. CORNWALL,
HUGH K. WAGNER.